(12) United States Patent
Fukada et al.

(10) Patent No.: US 8,179,571 B2
(45) Date of Patent: May 15, 2012

(54) APPARATUS, METHOD AND PROGRAM FOR PROCESSING AN IMAGE

(75) Inventors: Shinichi Fukada, Kawasaki (JP); Akio Suzuki, Setagaya-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/037,203

(22) Filed: Feb. 28, 2011

(65) Prior Publication Data
US 2011/0149318 A1    Jun. 23, 2011

Related U.S. Application Data

(63) Continuation of application No. 11/441,891, filed on May 26, 2006, now Pat. No. 7,920,291.

(30) Foreign Application Priority Data

Jun. 9, 2005    (JP) .................................. 2005-170016

(51) Int. Cl.
*G06K 15/00* (2006.01)

(52) U.S. Cl. ........ 358/2.1; 358/540; 358/518; 358/1.15; 358/1.9

(58) Field of Classification Search .................. 358/2.1, 358/540, 518, 1.15
See application file for complete search history.

(56) References Cited

U.S. PATENT DOCUMENTS

2006/0132871 A1*    6/2006    Beretta .......................... 358/518
* cited by examiner

*Primary Examiner* — Twyler Haskins
*Assistant Examiner* — Michael Burleson
(74) *Attorney, Agent, or Firm* — Canon USA, Inc., IP Division

(57) ABSTRACT

An image processing apparatus includes a comparison unit, a change unit, and a printing unit to perform variable printing in a form of a composite of a master page and a variable page. The comparison unit compares a color of the master page and a color of the variable page near a boundary line between the master page and the boundary page. In a case where the master page and the variable page are similar in color near the boundary line, the change unit changes the master page to another master page with a color that is not similar to the color of the variable page. The printing unit prints the another master page and the variable page in a composite form.

12 Claims, 21 Drawing Sheets

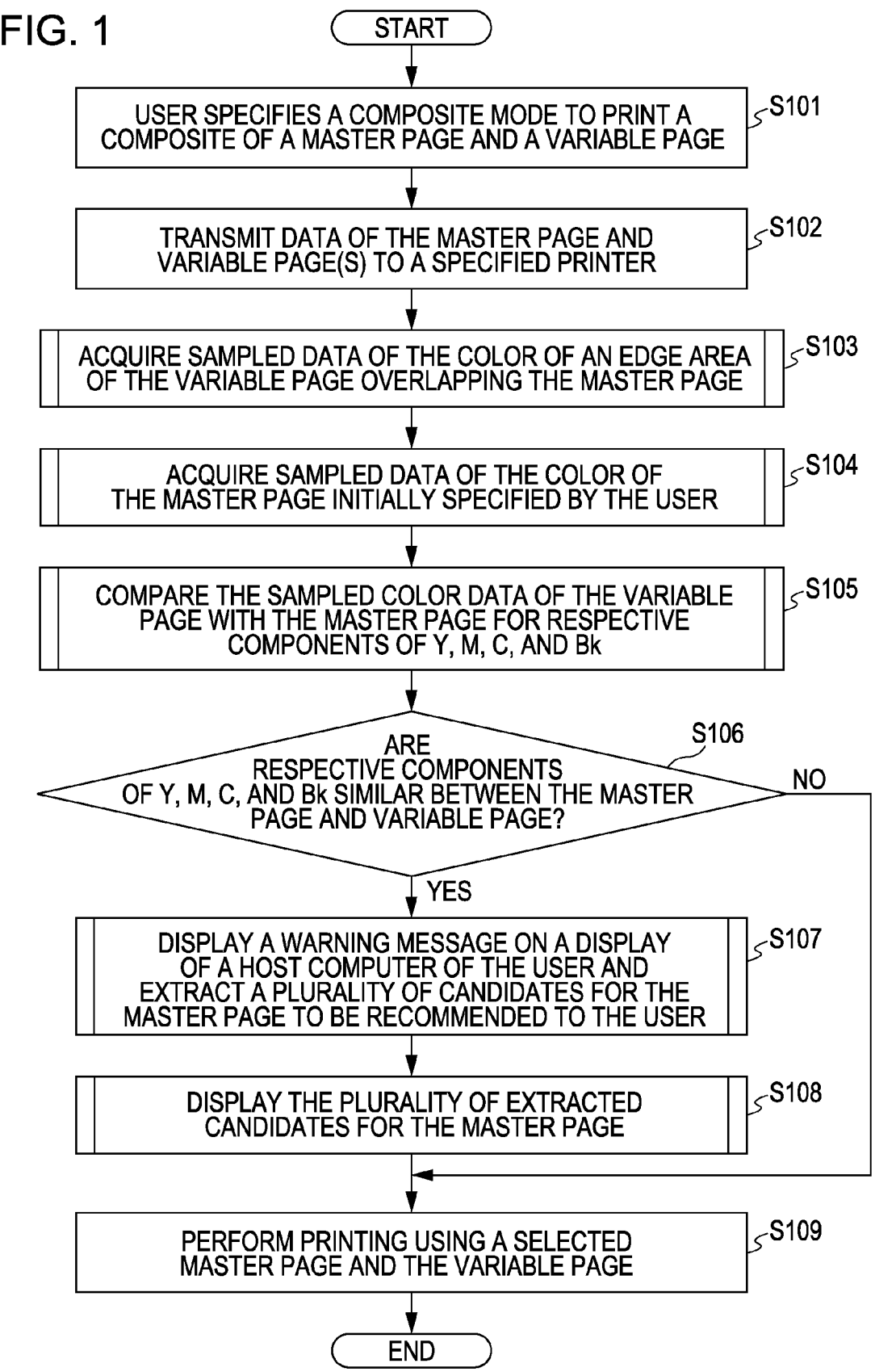

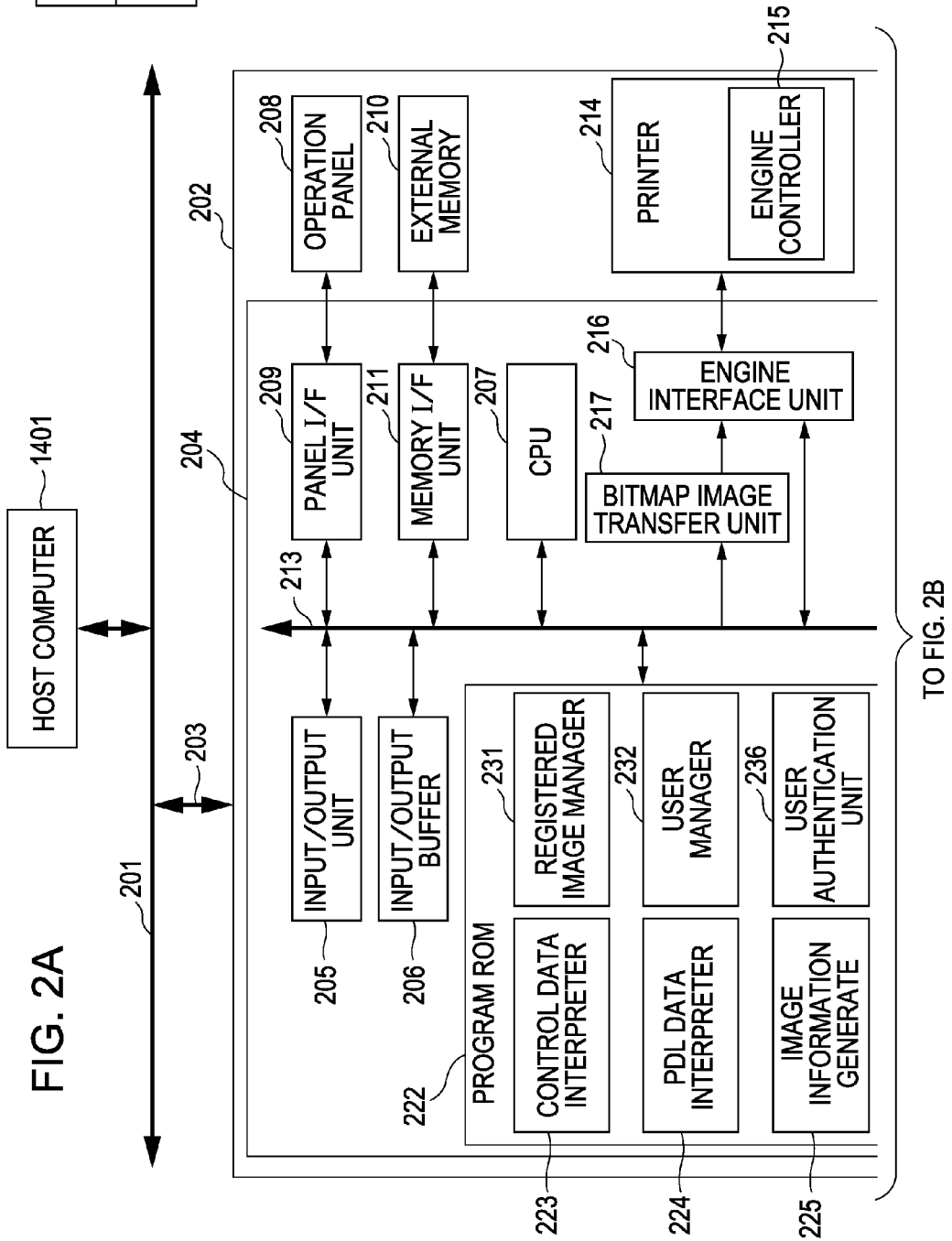

FIG. 15

| No. | INDISTINGUISHABILITY COLOR (DIFFERENCE ΔE) | DESTINATION OF WARNING | ACTION TO BE DONE | COMMENT |
|---|---|---|---|---|
| 1 | 0.2 | D | STOP PRINTING/ WAIT FOR A COMMAND TO BE ISSUED BY THE USER | ACCEPT ALSO A COMMAND ISSUED VIA THE DISPLAY PANEL OF THE IMAGE PROCESSING APPARATUS |
| 2 | 0.5 | D/Usr1/Usr2/Panel | DISCARD PRINT DATA/ CONTINUE PRINTING | — |
| 3 | 0.7 | D/Usr4/Usr5 | DISCARD PRINT DATA/ CONTINUE PRINTING | — |
| 4 | 0.9 | D/Panel | DISCARD PRINT DATA/ CONTINUE PRINTING | — |
| 5 | 1.2 | XXXX | XXXXX | XXXXXXXX |

D: SENDER OF DATA

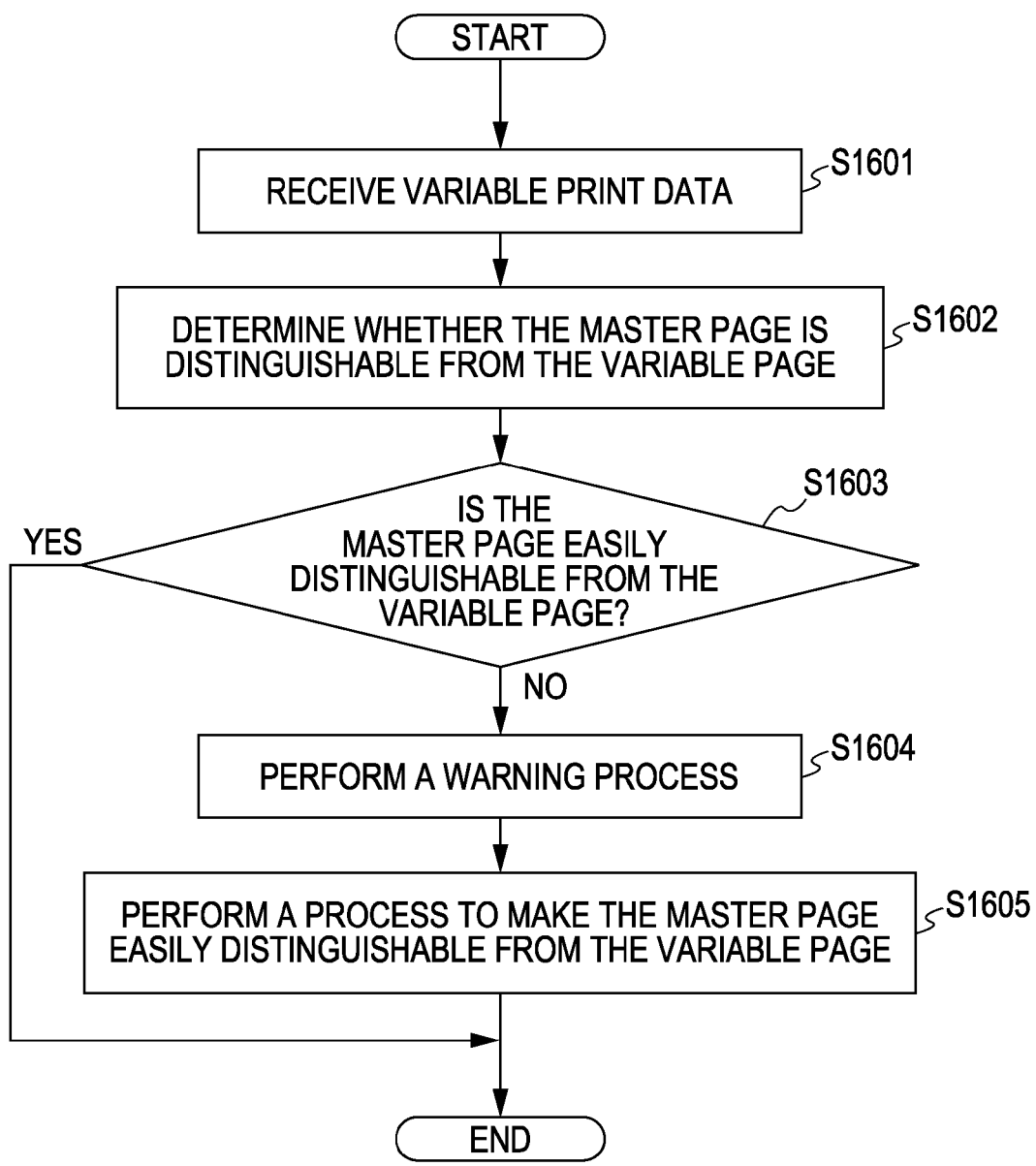

APPARATUS, METHOD AND PROGRAM FOR PROCESSING AN IMAGE

CROSS REFERENCE TO RELATED APPLICATIONS

The present application is a continuation of U.S. patent application Ser. No. 11/441,891, filed on May 26, 2006, which claims priority from Japanese Patent Application No. 2005-170016, filed Jun. 9, 2005, all of which are hereby incorporated by reference herein in their entirety.

BACKGROUND OF THE INVENTION

1. Field of the Invention

The present invention relates to an image processing apparatus such as a digital multifunction peripheral device, an image processing method, and a program, and more particularly, to an image processing apparatus, an image processing method, and a program, capable of performing variable printing in a clearly distinguishable form.

2. Description of the Related Art

A printing mode called variable printing is known. In the variable printing, a variable page (which may include, for example, a photographic image, a decorated character, etc.) and a master page serving as a background image are printed in a combined form. In practical variable printing, one master page and a plurality of variable pages are prepared, and each variable page is automatically combined with the common master page. The details of the variable printing are disclosed, for example, in Japanese Patent Laid-Open No. 2002-342039.

However, in the conventional variable printing technique, it is not easy to determine whether good distinguishability between a master page and a variable page is achieved in the overall page obtained as a combination of the variable page and the master page. Therefore, when a similar color is used for both the master page and the variable page, a boundary between the master page and the variable page in the resultant overall page becomes unclear. As a result, the variable page becomes visually indistinguishable from the master page or the master page becomes visually indistinguishable from the variable page.

Although it is rather easy for a user to adjust so that one variable page is distinguishable from one master page, it is very difficult and troublesome for a user to make adjustment for many variable pages.

SUMMARY OF THE INVENTION

In view of the above, embodiments of the present invention provide an image processing apparatus, an image processing method, and a computer program, that allow variable printing to be performed such that when a master page and a variable page are similar in color at a boundary between them (that is, when it is predicted that a variable page will be visually indistinguishable from a master page or the master page will be visually indistinguishable from the variable page), the similarity is eliminated to make the master page and the variable page distinguishable at the boundary between them.

According to another aspect of the present invention, an image processing apparatus is adapted to perform variable printing in the form of a composite of a master page and a variable page. The image processing apparatus includes a comparison unit configured to compare a color of the master page and a color of the variable page near boundary line between the master page and the boundary page, a change unit configured to, when the master page and the variable page are similar in color near the boundary line, change the master page to another master page with a color that is not similar to the color of the variable page, and a printing unit configured to print the changed master page and the variable page in a composite form.

According to another aspect of the present invention, an apparatus is adapted to perform variable printing in the form of a composite of a master page and a variable page. The apparatus includes a comparison unit configured to compare a color of the master page and a color of the variable page near a boundary line between the master page and the boundary page, a change unit configured to, when the master page and the variable page are similar in color near the boundary line, change at least a portion of one of the variable page and the master page to a color that is not similar to the color of the other page, and a printing unit configured to print the master page and the variable page in a composite form.

According to another aspect of the present invention, a method of performing variable printing in the form of a composite of a master page and a variable page, includes comparing a color of the master page and a color of the variable page near a boundary line between the master page and the variable page, changing, when the master page and the variable page are similar in color near the boundary line, at least a portion of one of the variable page and the master page to a color that is not similar to the color of the other page near the boundary line, and printing the master page and the variable page in a composite form.

According to another aspect of the present invention, a machine-readable medium is provided for having stored thereon instructions which, when executed by an apparatus, causes the apparatus to perform a method comprising, performing a comparison in terms of a color between the master page and the variable page near a boundary line between the master page and the variable page, changing, when the master page and the variable page are similar in color near the boundary line, at least a portion of one of the variable page and the master page to a color that is not similar to the color of the other page near the boundary line, and printing the master page and the variable page in a composite form.

According to another aspect of the present invention, a program is stored on a computer-readable storage medium to perform a process of performing variable printing in the form of a composite of a master page and a variable page, the program includes performing a comparison in terms of a color between the master page and the variable page near a boundary line between the master page and the variable page, changing, when the master page and the variable page are similar in color near the boundary line, at least a portion of one of the variable page and the master page to a color that is not similar to the color of the other page near the boundary line, and printing the master page and the variable page in a composite form.

According to another aspect of the present invention, the image processing apparatus includes a comparison unit configured to compare a color of a first master page and a color of an edge area of an object in a variable page, and a change unit configured to, when a color difference between the first master page and the edge area of the object is equal to or less than a predetermined threshold value, change the first master page to a second master page having a color that is not similar to the color of the edge area of the object.

According to another aspect of the present invention, a method includes comparing a color of a first master page with a color of an edge area of an object in a variable page, and changing, when a color difference between the first master page and the edge area of the object is equal to or less than a predetermined threshold value, the first master page to a second master page having a color that is not similar to the color of the edge area of the object.

According to another aspect of the present invention, a program is stored on a computer-readable storage medium to form an image by combining a master page and a variable page. The program includes comparing a color of a first master page with a color of an edge area of an object in the variable page, and changing, when a color difference between the first master page and the edge area of the object is equal to or less than a predetermined threshold value, the first master page to a second master page having a color that is not similar to the color of the edge area of the object.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is a flowchart showing a process according to an embodiment of the present invention.

FIG. 15 is a diagram showing an example of a warning process table according to an embodiment of the present invention.

FIG. 16 is a flowchart showing a process according to an embodiment of the present invention.

DESCRIPTION OF THE EMBODIMENTS

The present invention is described in detail below with reference to embodiments in conjunction with the accompanying drawings.

First Exemplary Embodiment

First, the structure and functions of a digital multifunction peripheral device are described in detail with reference to the accompanying drawings.

Figure 2B:
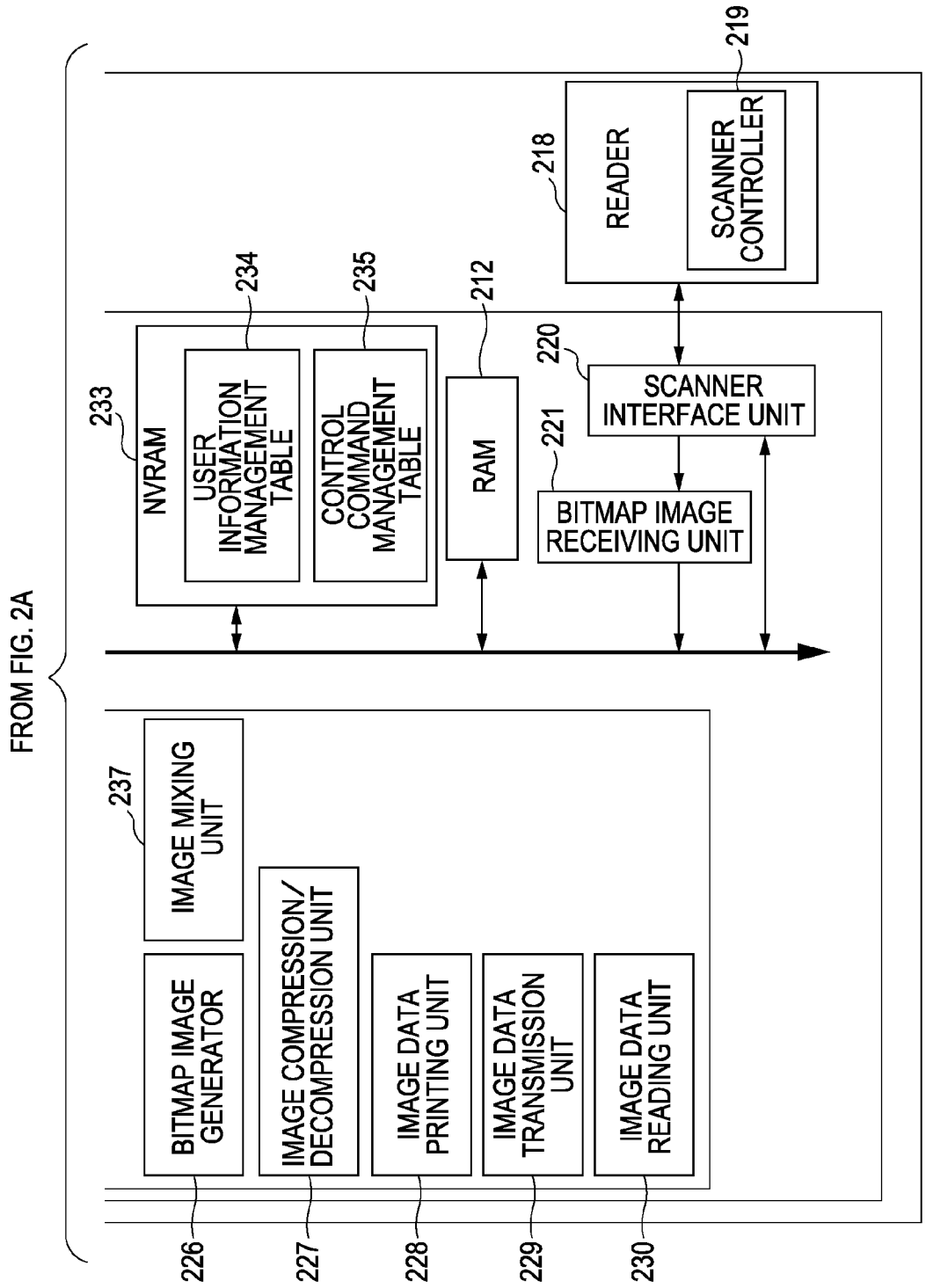
FIG. 2 includes FIG. 2A and FIG. 2B as block diagrams showing a system configuration of an exemplary host computer and an exemplary digital multifunction peripheral device.

FIG. 2 is a block diagram showing the structure of an exemplary host computer and an exemplary digital multifunction peripheral device.

Figure 14:
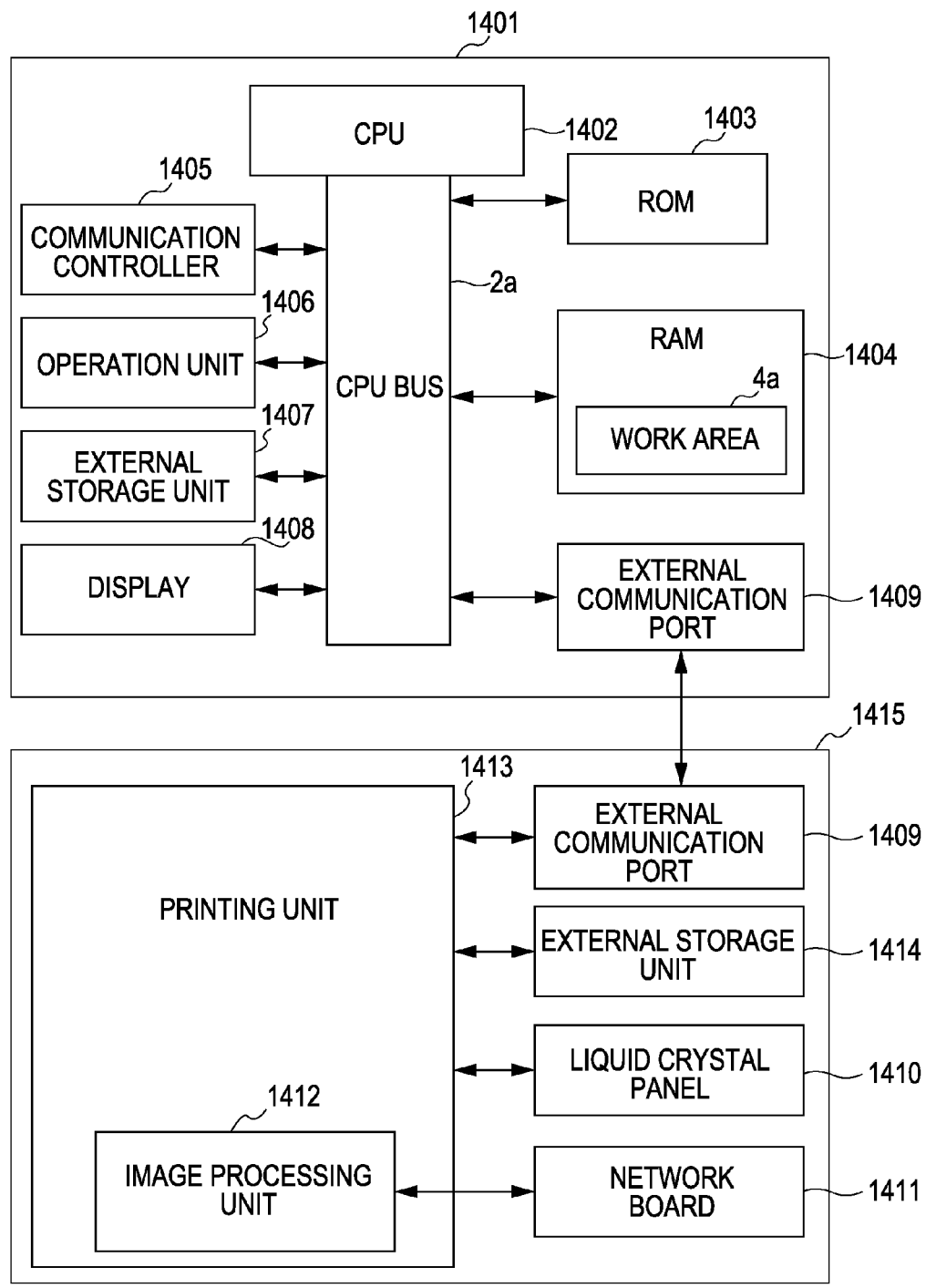
FIG. 14 is a block diagram of a host computer and an image processing apparatus according to an embodiment of the present invention.

The details of the host computer 1401 shown in FIG. 2 are shown in block 1401 of FIG. 14. The exemplary host computer 1401 illustrated in FIG. 14 includes a CPU 1402 adapted to control the image processing apparatus in accordance with a program read from a ROM 1403 via a CPU bus 2a. The host computer 1401 also includes a RAM 1404 used as a work area of the CPU 1402 and internally having a work area 4a, a communication controller 1405 adapted to control two-way communication with another host computers, a printer, etc., an operation unit (an input device such as a keyboard) 1406, an external storage unit 1407 such as a hard disk, a display 1408 (for example, a CRT display), and an external communication port 1409 that connects the host computer 1401 with the image processing apparatus 1415.

Referring again to FIG. 2, the exemplary digital multifunction peripheral device 202 includes a control unit 204 that controls the operation of the whole digital multifunction peripheral device 202, a printer 214 that performs printing of an output image on printing paper, a reader 218 adapted to read an image on paper and capture image data thereof, and an operation panel unit 208 which is used by a user to input a command or data to specify or control the operation of the digital multifunction peripheral device 202 and which is also used to display an error message, operation guidance information, etc. The digital multifunction peripheral device 202 also includes an external memory 210.

The control unit 204 communicates with the host computer 1401 via an input/output unit 205 responsible for input/output operation with the host computer 1401 (such as a client computer, a server, etc.) via a communication line 203 connected with a network 201.

An input/output buffer 206 is adapted to receive data including print control code and PDL data input from the network and to transmit various data from the digital multifunction peripheral device 202.

A CPU 207 controls the operation of the whole control unit 204.

In a program ROM 222, a program describing an operation of the CPU 207 is stored.

A RAM 212 serves as a work memory used in interpreting control codes or data, making a calculation necessary in printing or reading an image, or processing input/output image data.

A Nonvolatile RAM (NVRAM) 233 stores data which needs to be retained even after the power supply of the digital multifunction peripheral device is turned off. The NVRAM 233 includes a user information management table 234 and a control command management table 235.

The program ROM 222 includes a control data interpreter 223 that interprets print control data received from the host computer 1401, a PDL data interpreter 224 that interprets PDL (Page Description Language) data, and an image information generator 225 that generates various kinds of image objects. The program ROM 222 further includes a bitmap image generator 226 that converts an image object into a bitmap image, an image compression/decompression unit 227 that performs compression/decompression on a bitmap image, an image data printing unit 228 that controls printing of image data, an image data transmission unit 229 that controls transmission of image data, and an image data reading unit 230 that controls scanning of image data. The program ROM 222 also includes a registered image manager 231 that stores bitmap images and/or PDL data in the external memory 210 and manages them so that the stored data can be reused in a later printing operation or can be used as standard forms, a user manager 232 that manages user information such as user names and/or passwords assigned to users who are allowed to use the device, a user authentication unit 236 that authenticates a user when the user accesses the device via data or a panel, and an image mixing unit 237 that issues a warning when a problem with color processing occurs during variable printing and solves the problem. Note that the above-described units of the program ROM 222 are stored in the form of program modules.

The bitmap image transfer unit 217 transfers a bitmap image such as a bitmap image generated by the bitmap image generator 226 or a bitmap image read by the reader 218 to the printer 214.

An engine interface unit 216 serves as an interface between the printer 214 and the control unit 204. A scanner interface unit 220 serves as an interface between the reader 218 and the control unit 204.

A bitmap image receiving unit 221 captures the bitmap image read by the reader 218.

A panel interface unit 209 serves as an interface between the control unit 204 and the operation panel unit 208.

A memory interface unit 211 serves as an interface between the external memory 210 and the control unit 204. The external memory is used to store print data, image data supplied from the outside, and various kinds of information associated with the printer 214.

A system bus 213 transfers data among the units described above.

A liquid crystal panel is used as the operation panel 208 that displays registered images, information indicating the printing operation status, and various kinds of information associated with the digital multifunction peripheral device 202. This liquid crystal panel also serves as a touch panel capable of detecting a touch by a user thereby allowing the user to input character information or the like via its screen. The liquid crystal panel includes a start key used to issue a start command such as a copy start command, a reset key used to reset the apparatus, a power switch used to turn on/off electric power, a ten-key pad used to specify, for example, the number of copies, cursor keys and an enter key that are used to move a cursor displayed on the liquid crystal panel and to select one of functions displayed on the liquid crystal panel, function keys used to select functions of the digital multifunction peripheral device 202 such as a copy function, an image transmission function, and a document management function, and a login key used for identification and authentication of a user of the device.

The printer 214 includes an engine controller 215 responsible for control of print operation including feeding and ejection of paper.

The reader 218 includes a scanner controller 219 responsible for control of image reading operation including feeding of a document to be scanned, reading of an image, and ejecting of the document.

Figure 3:
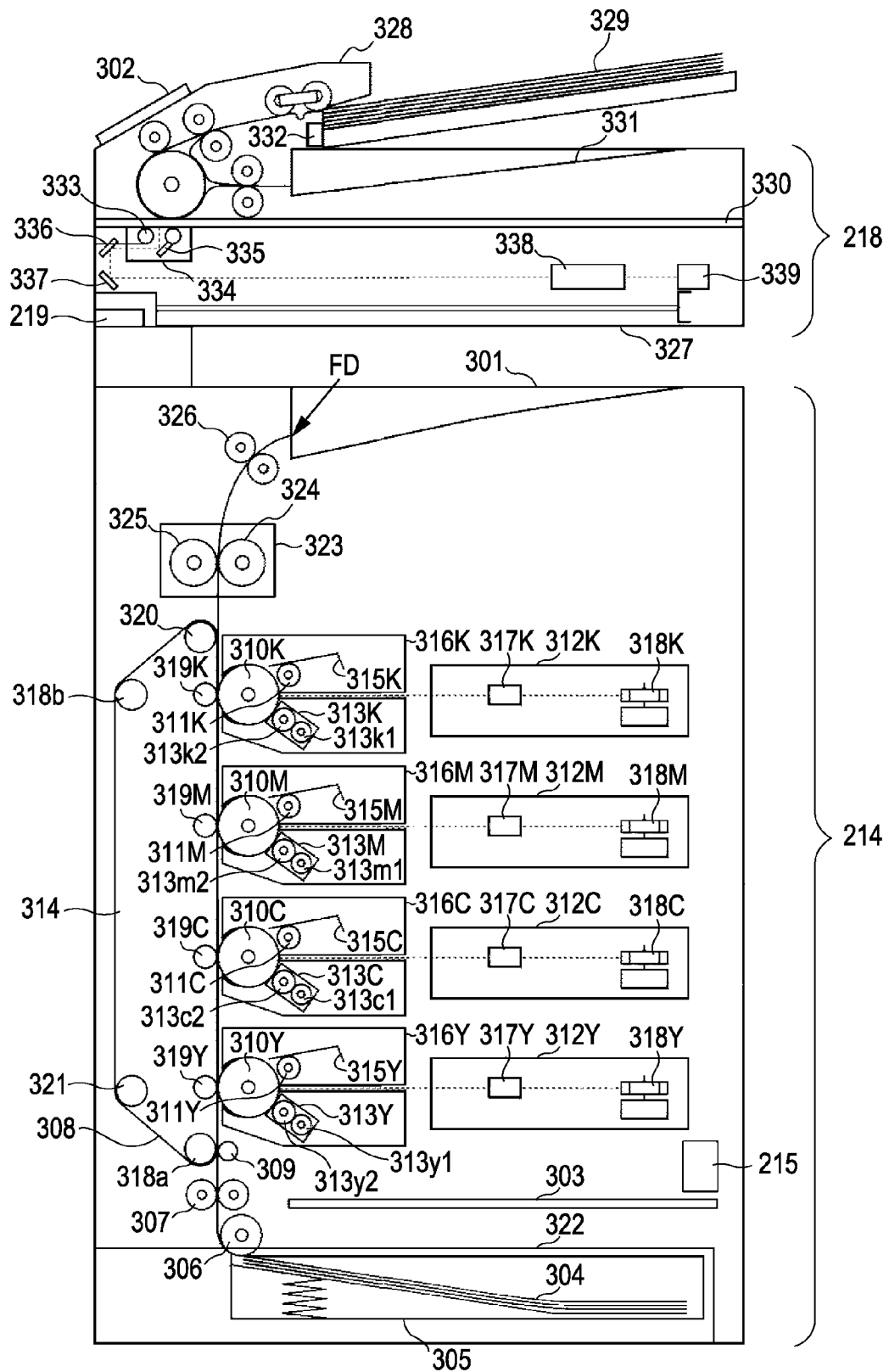
FIG. 3 is a diagram showing an internal structure of an exemplary digital multifunction peripheral device.

The digital multifunction peripheral device 202 shown in FIG. 2 includes a housing 301 of the printer 214 and the reader 218 as shown n FIG. 3.

The reader 218 includes a document feeding unit 328 for feeding document paper, and a scanner unit 327 for scanning a document sheet.

In the housing 301, there are disposed various mechanical parts of the printer 214, the engine controller 215 that controls a printing operation performed using the mechanical parts of the printer 214, and a control board box 303 in which the control unit 204 shown in FIG. 2 is installed.

The scanner unit 327 includes a scanner controller 219 that controls a scanning process performed using the document feeding unit 328 and various parts of the scanner unit 327.

The printer 214 includes four photosensitive drums 310 (310K, 310M, 310C, and 310Y) serving as image carrying media disposed one above another in a vertical direction in the printer 214.

The photosensitive drums 310 are rotated in a clockwise direction (in FIG. 3) by a driving unit (not shown). Around each photosensitive drum 310, there are disposed a charger unit 311 (311K, 311M, 311C, or 311Y) for uniformly charging the surface of the photosensitive drum 310, a print scanner 312 (312K, 312M, 312C, or 312Y) for forming an electrostatic latent image on the photosensitive drum 310 by applying a laser beam in accordance in image information, a developing apparatus 313 (313K, 313M, 313C, or 313Y) for developing the electrostatic latent image by applying toner to the electrostatic latent image thereby generating a toner image, an electrostatic image transfer unit 314 for transferring the toner image from the photosensitive drum 310 onto a transfer medium 304, a cleaning unit 315 (315K, 315M, 315C, or 315Y) for removing toner residual on the surface of the photosensitive drum 310 after the toner image is transferred, and a process cartridge 316 (316K, 316M, 316C, or 316Y) having an integrated cartridge form and capable of being removably attached to the housing 301.

Each unit is described in further detail below.

The photosensitive drum 310 is formed by coating an organic photoconductor layer. The two ends of the photosensitive drum 310 are rotatably supported by supporting members. A driving force is applied by a driving motor (not shown) to one end of the photosensitive drum 310 such that the photosensitive drum 310 rotates in a clockwise direction.

Each charger unit 311 is formed in the shape of a roller with an electroconductive material. This roller is disposed in contact with the surface of the photosensitive drum 310 and a charging bias voltage is applied by a power source (not shown) to the roller so as to uniformly charge the surface of the photosensitive drum 310.

Each print scanner 312 is horizontally disposed on a side of a corresponding photosensitive drum 310. Image light is emitted by a laser diode (not shown) in accordance with the image signal such that the image light falls on a polygon mirror 318 (318K, 318M, 318C, or 318Y) rotated at a high speed by a scanner motor. The image light reflected by the polygon mirror falls on the photosensitive drum 310 via an imaging lens 317 (317K, 317M, 317C, or 317Y) such that the charged surface of the photosensitive drum 310 is selectively exposed so as to form an electrostatic latent image.

Each developing apparatus 313 (313K, 313M, 313C, or 313Y) includes a developing device in which toner is placed. Note that the color of toner varies depending on the location of each developing apparatus 313. In the example shown in FIG. 3, developing apparatus for colors of yellow, cyan magenta, and black are disposed in the direction in which the transfer medium 304 is transported (in the direction from down to up in FIG. 3). When the electrostatic latent image on the photosensitive drum 310 is developed, toner in containers of the respective developing devices are delivered by delivering mechanisms to corresponding coating rollers 313$k$1, 313$m$1, 313$c$1, and 313$y$1, and toner is coated around each developing roller such that thin layers of toner of respective colors are formed around the corresponding developing rollers 313$k$2, 313$m$2, 313$c$2, and 313$y$2. The toner of each color is electrostatically charged. A developing bias voltage is applied between the developing roller and the photosensitive drum 310 on which the electrostatic latent image is formed so that toner adheres to the electrostatic latent image and thus the electrostatic latent image is developed into a toner image.

The cleaning unit 315 removes residual toner that remains on the surface of the photosensitive drum 310 without being transferred when the toner developed by the developing unit 313 was transferred from the photosensitive drum 310 to the transfer medium 304.

An electrostatic transport belt 308 is disposed so as to face all photosensitive drums 310K, 310M, 310C, and 310Y. The electrostatic transport belt 308 circulates while being maintained in contact with the photosensitive drums 310K, 310M, 310C, and 310Y. This electrostatic transport belt 308 is supported in a vertical direction by four rollers (on the left-hand side of FIG. 3). The transfer medium 304 is electrostatically stuck to the outer surface of the electrostatic transport belt 308, and is transported by the circulating electrostatic transport belt 308 such that the transfer medium 304 is brought into contact with the photosensitive drums 310. A stick roller 309 is disposed so as to be in contact with the electrostatic transport belt 308, at an upstream position of a path along which the transfer medium is transported. When the transfer medium 304 is transported, the transfer medium 304 is stuck to the electrostatic transport belt 308 by applying a bias voltage to the stick roller 309 to generate an electric field between the stick roller 309 and the grounded roller 318$a$ thereby generating dielectric polarization in the electrostatic transport belt 308 and also in the transfer medium 304 and thus creating an electrostatic attractive force between them. The transfer medium 304 stuck to the electrostatic transport belt 308 is transported to an image transfer position, and the toner images on the respective photosensitive drums 310 are sequentially transferred to the transfer medium 304.

Transfer rollers 319 (319$k$, 319$m$, 319$c$, and 319$y$) serving as transfer devices are disposed at locations corresponding to the respective four photosensitive drum 310K, 310M, 310C, and 310Y such that the transfer rollers 319 are in contact with the inner surface (back surface) of the electrostatic transport belt 308. The transfer roller 319 is connected to a transfer bias power supply (not shown). The transfer roller 319 is disposed facing the photosensitive drum 310 so as to form a transfer unit. A positive charge is applied from the transfer roller 319 to the transfer medium 304 via the electrostatic transport belt 308. An electric field generated by this charge causes a negatively-charged toner image on the photosensitive drum 310 to be transferred to the transfer medium 304 in contact with the photosensitive drum 310.

The electrostatic transport belt 308 is stretched by a total of four belts, that is, a drive roller 320, driven rollers 318$a$ and 318$b$, and a tension roller 321 such that the electrostatic transport belt is rotatable in the clockwise direction in FIG. 3. When the transfer medium 304 is carried from the driven roller 318$a$ to the drive roller 320 by the electrostatic transport belt 308 moving in a circulating fashion, the toner image on the photosensitive drum 310 is transferred to the transfer medium 304.

A feeder unit 322 is for feeding the transfer medium 304 to the image forming unit, a plurality of transfer media 304 are placed in a feeder cassette 305. In the image forming operation, a feed roller (half-moon roller) 306 and a registration roller pair 307 rotate to feed the transfer medium 304 one by one from the feeder cassette 305. When the leading end of the transfer medium 304 comes into the contact with the registration roller pair 307, the transfer medium 304 is stopped for a short period to form a loop. Thereafter, the transfer medium 304 is fed to the electrostatic transport belt 308.

A fixing unit 323 is for fixing the toner image transferred to the transfer medium 304. The fixing unit 323 includes a heating roller 324 driven to rotate and also includes a pressure roller 325 that is urged against the heating roller 324 to apply heat and pressure to the transfer medium 304. That is, when the transfer medium 304 having the toner image transferred from the photosensitive drum 310 is moved through the fixing unit 323 by the pair of fixing rollers 324 and 325, heat and pressure is applied to the transfer medium 304 by the pair of fixing rollers 324 and 325 thereby fixing the toner image with a plurality of colors on the surface of the transfer medium 304.

The yellow process cartridge 316Y, the magenta process cartridge 316M, and the cyan process cartridge 316C are constructed so that a lifting mechanism (not shown) can move the photosensitive drums 310Y, 310M, and 310C away from the position in contact with the electrostatic transport belt 308. The lifting mechanism operates depending on the selected print mode. More specifically, for example, in a color mode in which a color document is printed under the control of the engine controller 215, the photosensitive drums 310Y, 310M, and 310C are brought into contact with the electrostatic transport belt 308. In this state, by applying the voltage from transfer rollers 319Y, 319M, 319C, and 319K, color toner images on the photosensitive drum 310 are sequentially transferred in the order yellow, magenta, cyan, and black. On the other hand, in a monochrome mode in which a monochrome document is printed, the lifting mechanism moves the photosensitive drum 310Y, 310M, and 310C away from the electrostatic transport belt 308 so that only the photosensitive drum 310K is in contact with the electrostatic transport belt 308. In this state, by applying the voltage from the transfer roller 319K, only a black toner image on the photosensitive drum 310K is transferred.

After the toner image is transferred to the transfer medium 304, the transfer medium 304 is separated from the electrostatic transport belt 308 by the drive roller 320. If the transfer medium 304 reaches the fixing unit 323, the toner image is fixed by heat and the resultant transfer medium 304 is ejected to an exit section F by an exit roller pair 326.

The digital multifunction peripheral device is also capable of reading an image from document paper using the reader 218. The document feeding (DF) unit 328 of the reader 218 feeds document sheets 329 one by one from the top of the stack document sheets onto platen glass 330. If reading of one document sheet by the scanner unit 327 is completed, the document sheet on the platen glass 330 is transported to an output tray 331.

The document feeding unit 328 has a sensor 332 to detect presence of a document sheet.

In the scanner unit 327, when a document sheet is placed on the platen glass 330, a lamp 333 is lighted, an optical unit 334 is started to be moved from left to right in FIG. 3 to scan the document sheet while illuminating the document sheet with light. Light reflected from the document sheet travels to a CCD image sensor 339 via mirrors 335, 336, and 337 and a lens 338. The image of the document scanned in the above-described manner is read by the CCD image sensor 339.

The image data output by the CCD image sensor 339 is subjected to a predetermine process and the resultant image data is sent to the control unit 204 via the scanner interface unit 220 shown in FIG. 2.

An operation panel 302, which serves as the operation panel unit 208 shown in FIG. 2, is disposed on the document feeding unit 328. The operation panel 302 includes switches used to input various commands or data, LED indicators for indicating information, and a LCD display. To the operation panel 302, an external memory unit is attached, which serves as the external memory 210 shown in FIG. 2 and which is used to store print data or the like by the printer controller.

Now, referring to FIG. 2, the functions and the operation of the digital multifunction peripheral device 202 and the cooperation with the host computer 1401, in accordance with an exemplary embodiment, are described below. Although in the following explanation, it is assumed that the digital multifunction peripheral device operates in conjunction with the host computer 1401, the host computer 1401 may be replaced with an arbitrary computer such as a computer located on a network.

User Authentication

In the exemplary digital multifunction peripheral device, if a user ID and a password are detected during interpretation of control data, the user authentication unit 236 checks whether a user who has input the ID and the password is authorized to use the digital multifunction peripheral device. If the user issues a command to execute printing of the document produced on the host computer 1401, a control code and print data (described in PDL) are sent from the host computer 1401 to the present digital multifunction peripheral device via the communication line 203, and the received data are stored in the RAM 212 via the input/output unit 205 and the input/output buffer 206. The data are transmitted, for example, in the form of packet data.

In the header of the packet data, an ID representing the type of the packet is described. In the first embodiment, the data type is print data, and thus an ID indicating that the data type is print data is described in the header. Following the header, device control data is described in the packet. The device control data includes a sequence of commands such as a device control command, a command to change a setting of the device, a command to set a management status of the device, etc. The device control data also includes the user ID and the password corresponding to the ID, which are necessary to use the host computer 1401 and which were issued in advance by the host computer 1401. In the packet data, print data in the form of PDL data is described following the device control data or between adjacent device control data. If the user ID is detected during the interpretation of the device control data described in the input packet data, the user authentication unit 236 checks the user information management table 234 in which user information is registered and which is stored in the NVRAM 233 to determine whether the user ID and the password are valid. If the user authentication is successfully passed, the device control data is processed in a mode assigned to the authenticated user until the process is completed. On the other hand, if the user ID or the password is not valid and thus the user authentication is not successful, the following operation is performed in a mode allowed for general users having no license. In general, any other process is stopped until the user authentication process is completed. Therefore, it is desirable to finish the user authentication process as quickly as possible. This is true in particular when the process is performed differently depending on the user as is the case in the first embodiment. In the first embodiment, it is assumed that data associated with the user ID and the password are set prior to the other commands. User authentication is also performed when a user inputs a command or data via the operation panel unit 208. More specifically, if the log-in key on the operation panel unit 208 is pressed, a screen for inputting a user name and a password is displayed on the liquid crystal panel. If the user inputs a user ID and a password by using a cursor or the like, the user authentication is performed based on the input user ID and password. If the user authentication is successful, the following process may be performed in a mode allowed for the user. However, if the command or data is input without pressing the log-in key, the user is regarded as a non-authenticated user and the following process may be performed in a mode allowed for non-authenticated users.

Image Generation Function

The exemplary digital multifunction peripheral device has an image generation function that allows it to print or register a document specified by the host computer 1401. In accordance with a program stored in the program ROM 222, the CPU 207 extracts device control data from the received packet data. The control data interpreter 223 determines which function of the device a control command specifies to be executed. The control data interpreter 223 also makes settings associated with default information of the device. The user authentication unit 236 performs the user authentication process as described above. If the user authentication process by the user authentication unit 236 and the process by the control data interpreter 223 are completed, the PDL command interpreter 224 interprets the PDL data. In accordance with the PDL data, the image information generator 225 generates image information associated with each image object such a character or image data. If the image information generator 225 has generated image information for all image objects in one page to be printed, the bitmap image generator 226 converts the image objects in the page into bitmap image data in a form that can be used in printing and stores the resultant bitmap image data into the RAM 212. The image compression/decompression unit 227 compresses the bitmap image data and stores the resultant compressed image data into the RAM 212. Use of control code makes it possible to perform an operation in conjunction with an image registration function described lather such that when there is data waiting to be interpreted by the control data interpreter 223 or the data interpreter 224 or when there is image data (intermediate object image data) waiting to be converted into bitmap image data by the bitmap image generator 226, such data may be stored in the RAM 212.

Scanned Image Capturing Function

The exemplary digital multifunction peripheral device has a scanned image capturing function to capture a scanned image of a document from the reader 218, for use in printing or for storage. If a user issues a scan command via the operation panel unit 208 or the host computer 1401, a control command corresponding to the scan command is issued by the operation panel unit 208 or the host computer 1401. In the case in which the scan command is issued via the operation panel unit 208, the scan command is sent from the operation panel unit 208 to the CPU 207 via the panel interface unit 209. If the CPU 207 receives the scan command, the CPU 207 performs an image data capturing operation in accordance with an image data capturing program stored in the program ROM 222 More specifically, the reader 218 is operated via the scanner interface unit 220 such that a scanned image of a document is acquired from the reader 218 via the scanner interface unit 220, the acquired image is stored in the RAM 212 via the bitmap image receiving unit 221, the image is converted into a compressed form by using the image compression/decompression unit 227, and the resultant compressed image is stored in the RAM 212.

Image Registration Function

The exemplary digital multifunction peripheral device has an image registration function to store and register an image in the external memory 210. The image may be acquired via the image generation function described above or via the scanned image capturing function described above. If a command is issued to store and register, in the external memory 210, an image acquired via the image generation function or the scanned image capturing function, the compressed image stored in the RAM 212 is transferred to the external memory 210 via the memory interface unit 211 and stored in the external memory 210. The image is stored in the form of a file with a file name such as "File0001", and the registered image manager 231 registers associated setting information by transferring the setting information from the RAM 212 to the external memory 210. The setting information is stored in the nonvolatile memory NVRAM 233 as required so that the setting information is not lost when the electric power of the digital multifunction peripheral device is turned off.

The image registration function allows not only compressed bitmap images but also intermediate data to be stored in the external memory 210. For example, data waiting to be interpreted by the control data interpreter 223 or the PDL data interpreter 224 or intermediate object image data waiting to be processed by the bitmap image generator 226 may be directly stored in the external memory 210.

Image Printing Function

The exemplary digital multifunction peripheral device has an image printing function to read compressed image data from the RAM 212 and print an image in accordance with the read image data. The image data may be such as data that has been stored in the RAM 212 after being generated via the image generation function described above or captured via the scanned image capturing function described above. If a command is issued to print a specified image acquired via the image generation function or the scanned image capturing function, the CPU 207 performs a printing operation in accordance with an image data printing program stored in the program ROM 222 so that the specified compressed image data stored in the RAM 212 is converted to bitmap image data using the image compression/decompression unit 227, the image is printed in accordance with the bitmap image data. The CPU 207 sets various kinds of setting information associated with the paper feeding slot, the paper exit slot, the printing mode, etc. to the engine controller 215 via the engine interface unit 216. The CPU 207 then sends the specified image data to the engine controller 215 via the bitmap image transfer 217 and the engine interface unit 216. The printing of the specified image data is then performed and resultant printed paper is ejected via the specified paper exit slot.

It is also possible to a select an image registered via the image registration function and print the selected image. In this case, if the specified image data stored in the RAM 212 is data including control data, the control data interpreter 223 interprets the data. In a case in which the specified image data is PDL data, the PDL data interpreter 224 interprets the data. The image information generator 225 generates an intermediate object image by processing the specified image data. The bitmap image generator 226 converts image objects included in the intermediate object image data into a bitmap image in a printable form. The bitmap image transfer unit 217 transfers the bitmap image data to the engine controller 215 of the printer 214 via the engine interface unit 216. The printer 214 performs printing in accordance with the received bitmap image data.

In the case in which image data is given in the form of intermediate object image data, the bitmap image generator 226 converts image objects into bitmap image data in the printable form on a page-by-page basis. The bitmap image transfer unit 217 transfers the resultant bitmap image data to the engine controller 215 of the printer 214 via the engine interface unit 216. The printer 214 performs printing in accordance with the received bitmap image data.

Printing Function

The exemplary digital multifunction peripheral device has a printing function, which is realized using the image generation function and the image printing function. If a print command is issued from the host computer 1401, the print command is treated by this printing function. More specifically, in accordance with the print command, the CPU 207 executes the image generation function and the image printing function such that the image document received from the host computer 1401 is converted into a proper form and stored by the image generation function, and printing is performed by the image printing function, and thus the document generated by the host computer 1401 is printed by the printer 214.

Copying Function

The exemplary digital multifunction peripheral device has a copying function, which is realized using the scanned image capturing function and the image printing function. If a user sets a document to be copied on the reader 218 and presses a start key after selecting a copy key on the operation panel unit 208 or if a copy command is sent as control data from the host computer 1401, then the CPU 207 executes the scanned image capturing function and the image printing function such that the scanned image of the document is captured and stored in the RAM 212 by the scanned image capturing function, and printing is performed by the image printing function whereby the printer 214 prints the document image.

Image Transmission Function

The exemplary digital multifunction peripheral device has a function of transmitting an image registered by the image registration function to a computer or another digital multifunction peripheral device. If a user selects a document to be transmitted via the operation panel unit 208 and issues a command to transmit the document displayed on the liquid crystal panel, or if a command to transmit a specified document is issued by the host computer 1401, the CPU 207 performs a process in accordance with a program of an image data transmission unit 229 stored in the program ROM 222 such that the document is converted into a bitmap image and stored in the RAM 212 by the image compression/decompression unit 227. The image is then attached to an electric mail and transmitted, via the input/output buffer 206 and the input/output unit 205, to a mail address specified by the user via the operation panel unit 208 or via the host computer 1401.

The configuration and the functions of an exemplary digital multifunction peripheral device has been described above.

FIG. 1 is a flowchart showing a process according to the first embodiment of the present invention.

In the first embodiment, when a master page and a variable page are printed in the variable printing mode, if the master page and the variable page are similar in color at the boundary between them, the master page or the variable page is changed so that the similarity of color at the boundary is prevented. The master page serves as a boundary image and is used in common for a plurality of variable pages. That is, the master page is printed as the background image of each variable page. Each variable page forms a main part of each page. In practical variable printing, a common master page and a plurality of variable pages are prepared, and each variable page is automatically combined with the common master page. A plurality of master pages may also be prepared.

In step S101, a user issues a command via the display 1408 of the host computer 1401 to specify a synthesize mode in which a master page and a variable page are printed in a composite form.

In step S102, if a user issues a variable print command on the host computer 1401, a master page and variable pages selected by the user are sent to an image processing apparatus such as a printer specified by the user. If the image processing apparatus receives the variable pages and the master pages to be printed in the synthesize mode, the variable pages and the master page are processed in units of pages mainly by the image mixing unit 237.

In step S103, the image mixing unit 237 samples the color of the received variable pages in an edge area overlapping the master page.

Figure 4:
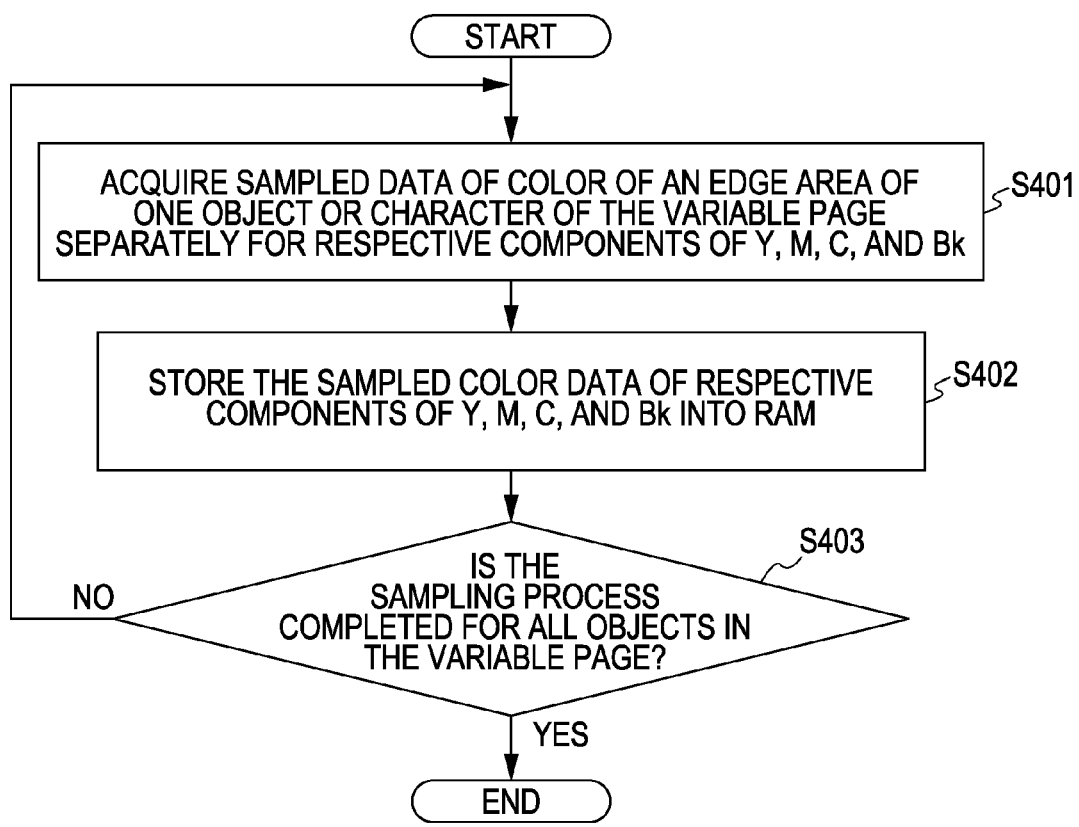
FIG. 4 is a flowchart showing a process of sampling colors of an edge area, which overlaps a master page, of a variable page, according to an embodiment of the present invention.

Referring to a flowchart shown in FIG. 4, the detailed operation of this step S103 is described below.

In step S401, the color of one object (for example, a figure or a character) of the variable page is sampled for each of color components Y, M, C, and Bk, which are print color components employed in the color image processing apparatus.

In step S402, the color component data sampled for respective components Y, M, C, and Bk are stored in the RAM 212.

In step S403, it is determined whether the sampling is completed for all objects of one variable page. If the sampling is not yet completed, steps S401 and S402 are repeated until the sampling is completed for all objects.

Referring again to FIG. 1, in step S104, the color of the master page, initially specified in step S101 by the user, is sampled.

Figure 5:
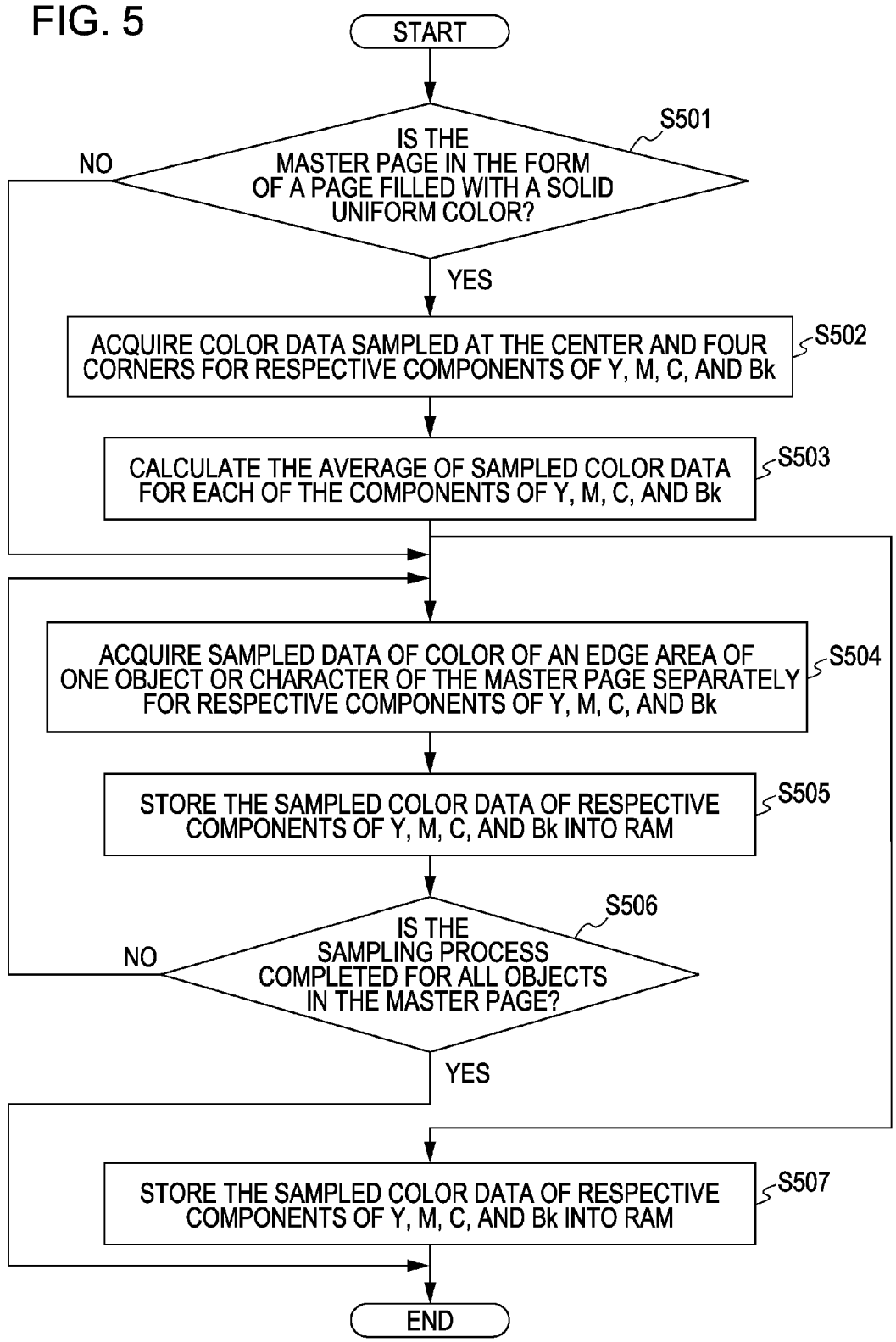
FIG. 5 is a flowchart showing a process of sampling colors of a master page initially specified by a user, according to an embodiment of the present invention.

Referring to a flowchart shown in FIG. 5, the detailed operation of this step S104 is described below.

The following process is performed differently depending on the content of the master page, and thus, in step S501, first of all, it is determined whether the master page is a solid image with a uniform color.

If it is determined in step S501 that the master page is a solid image of a uniform color, then in step S502, the color component data of the image is sampled at its center and four corners, for each of components of Y, M, C, and Bk which are print color components employed in the color image processing apparatus.

In step S503, averages of color component data sampled for respective components Y, M, C, and Bk are calculated, and the calculated average values are stored in the RAM.

On the other hand, in a case in which it is determined in step S501 that the master page is not a solid image of a uniform color, the process proceeds to step S504. In step S504, The color of an edge area of one object (such as a figure or a character) of the master page is sampled for each of components of Y, M, C, and Bk which are print color components employed in the color image processing apparatus. Alternatively, in this step S504, sampling may be performed for all pixels of the master page and for each of components of Y, M, C, and Bk.

In step S505, the color component data sampled for respective components Y, M, C, and Bk are stored in the RAM.

In step S506, it is determined whether the sampling is completed for all edge areas of the one master page. If the sampling is not yet completed, steps S504 and S505 are repeated until the sampling is completed.

Referring again to FIG. 1, in step S105, the color of the object of the variable page sampled in steps S103 and S104 is compared with the color near the boundary line where the master page overlaps the variable page for each of color components of Y, M, C, and Bk. The comparison may be performed between the master page and an area close to the object or between the master page and an area on an edge of the object of the variable page.

Figure 6:
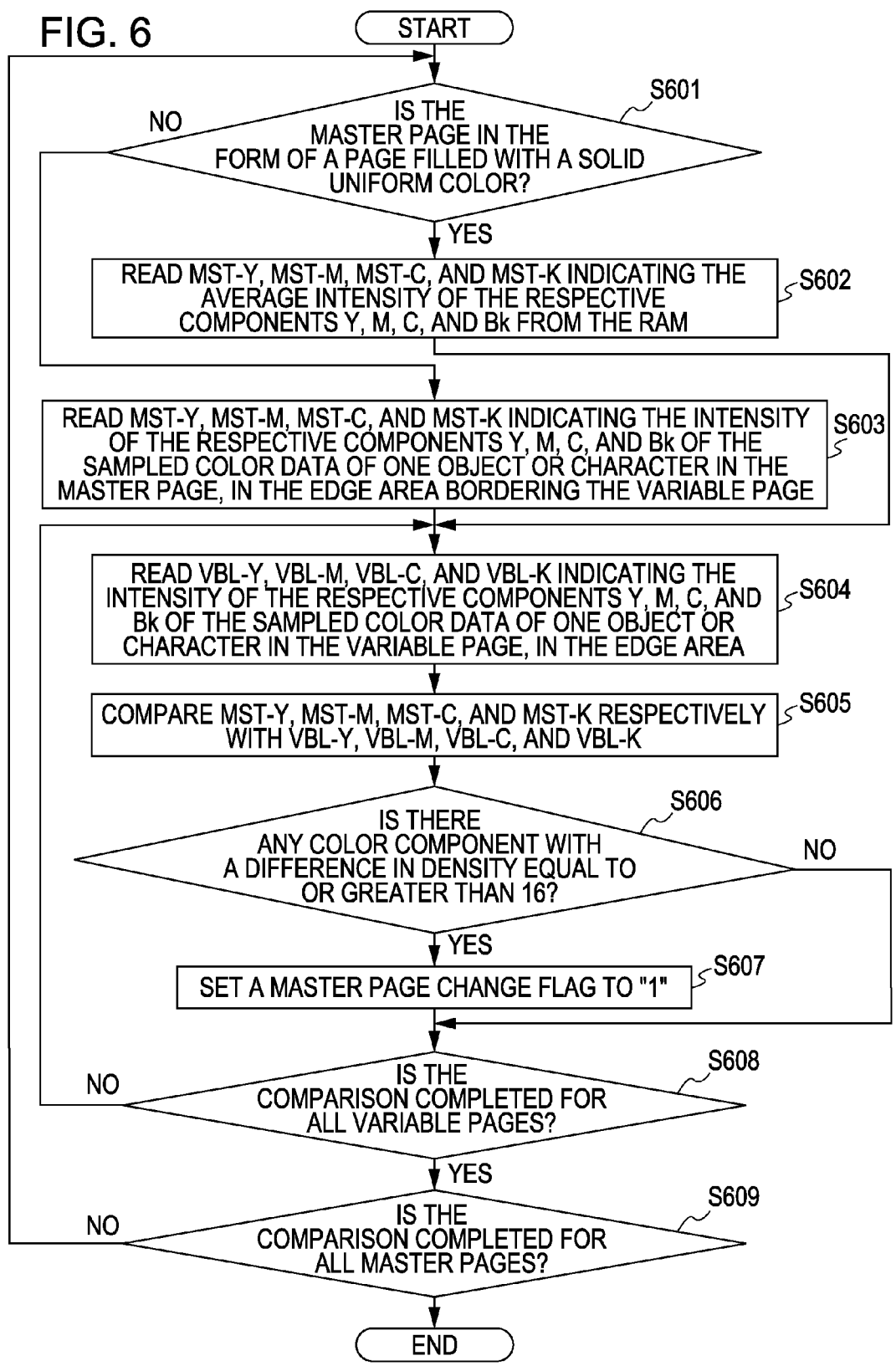
FIG. 6 is a flowchart showing a process of comparing the intensity of sampled data between a variable page and a master page according to an embodiment of the present invention.

Referring to a flowchart shown in FIG. 6, the operation of step S105 is described in further detail below.

The following process is performed differently depending on the content of the master page, and thus, in step S601, it is determined whether the master page is a solid image with a uniform color.

In a case in which it is determined in step S601 that the master page is a solid image of a uniform color, the process proceeds to step S602. In step S602, the color component data, which have been obtained via step S502 in which the color component of the image was sampled at the center and four corners of the image, step S503 in which the averages of the respective sampled color component data were calculated, and step S507 in which the average values of the respective color components Y, M, C, and Bk, which are print color components employed in the color image processing apparatus, were stored in the RAM 212, are read as MST-Y, MST-M, MST-C, and MST-Bk from the RAM 212.

On the other hand, in a case in which it is determined in step S601 that the master page is not a solid image of a uniform color, the process proceeds to step S603. In step S603, the color component data, which have been obtained via step S504 in which the color of the edge area of one object (such as a figure or a character) of the master page was sampled for each of components of Y, M, C, and Bk which are print color components employed in the color image processing apparatus and step S505 in which the resultant respective color component values Y, M, C, and Bk were stored in the RAM 212, are read as MST-Y, MST-M, MST-C, and MST-Bk from the RAM 212.

In step S604, the data which have been obtained via step S401 in which the color of one object (for example, a figure or a character) of the variable page was sampled for each of color components Y, M, C, and Bk, which are print color components employed in the color image processing apparatus and step S402 in which the resultant respective color component values Y, M, C, and Bk were stored in the RAM 212, are read as VBL-M, VBL-C, VBL-Y, and VBL-Bk from the RAM 212.

In step S605, the color component values MST-Y, MST-M, MST-C, and MST-Bk read in step S602 or 5603 from the RAM 212 are compared with the respective color component values VBL-M, VBL-C, VBL-Y, and VBL-Bk read in step S604 from the RAM 212.

In step S606, it is determined whether the difference is equal to or less than 16 for at least one of the color components.

If it is determined in step S606 that the difference is equal to or less than 16 for at least one of the color components, then in step S607, a master page change flag is set.

In step S608, it is determined whether the comparison with one master page performed via steps S604 to S607 is completed for all variable pages. If the comparison is not yet completed for all variable pages, steps S604 to S607 are repeated until the comparison is completed. If the comparison is completed, the process proceeds to step S609.

In step S609, it is determined whether the comparison with one master page performed via steps S604 to S607 for each of all variable pages is completed for all master pages. If the comparison is not yet completed for all master pages, steps S601 to S608 are repeated until the comparison is completed for all master pages.

Referring again to FIG. 1, in step S106, from the result of the comparison in terms of the respective color components Y, M, C, and Bk, it is determined whether the master page and the variable page are similar in color near boundary line.

Figure 20:
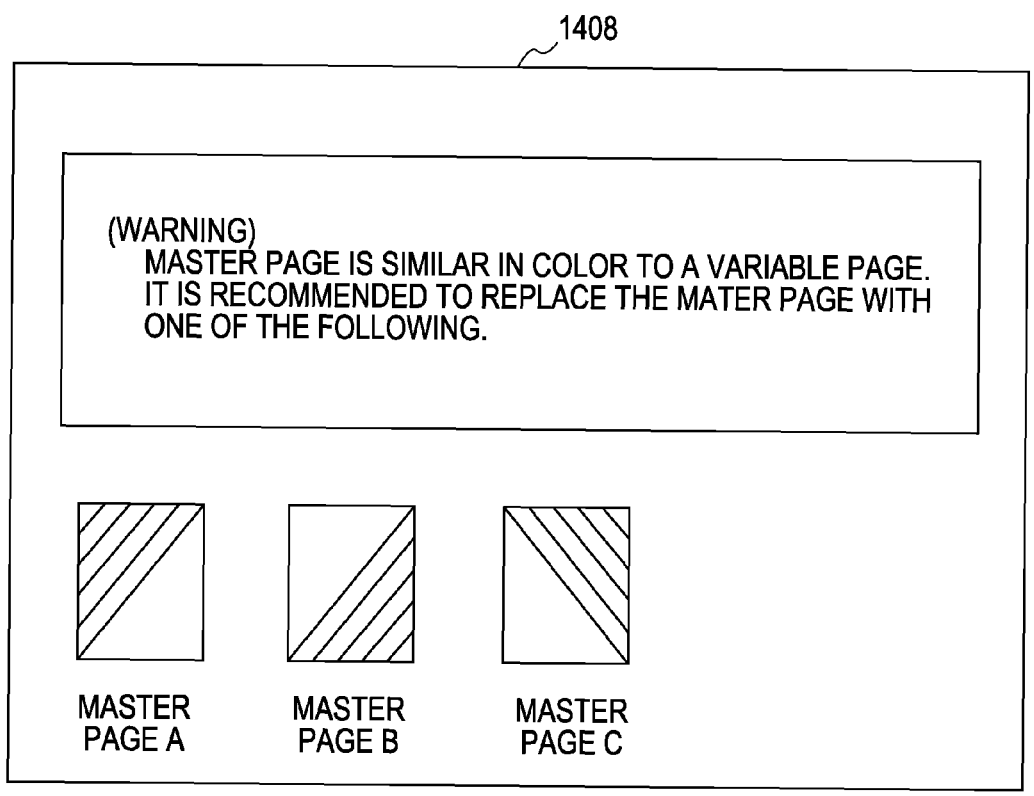
FIG. 20 shows an example of a warning to a user, which is issued when the color difference between a master page and a variable is smaller than a predetermined threshold value at a boundary between the master page and the variable page and which is displayed on a screen of a display, according to an embodiment of the present invention.

If it is determined in step S106 that colors are similar, that is, the difference in any color component near a boundary line between the master page and the variable page is less than a predetermined threshold value, the process proceeds to step S107. In step S107, a warning is given to a user by displaying a warning message such as that shown in FIG. 20 on the display 1408 of the host computer 1401, and a plurality of candidates for the proper master page for use with the variable pages are extracted.

Figure 7:
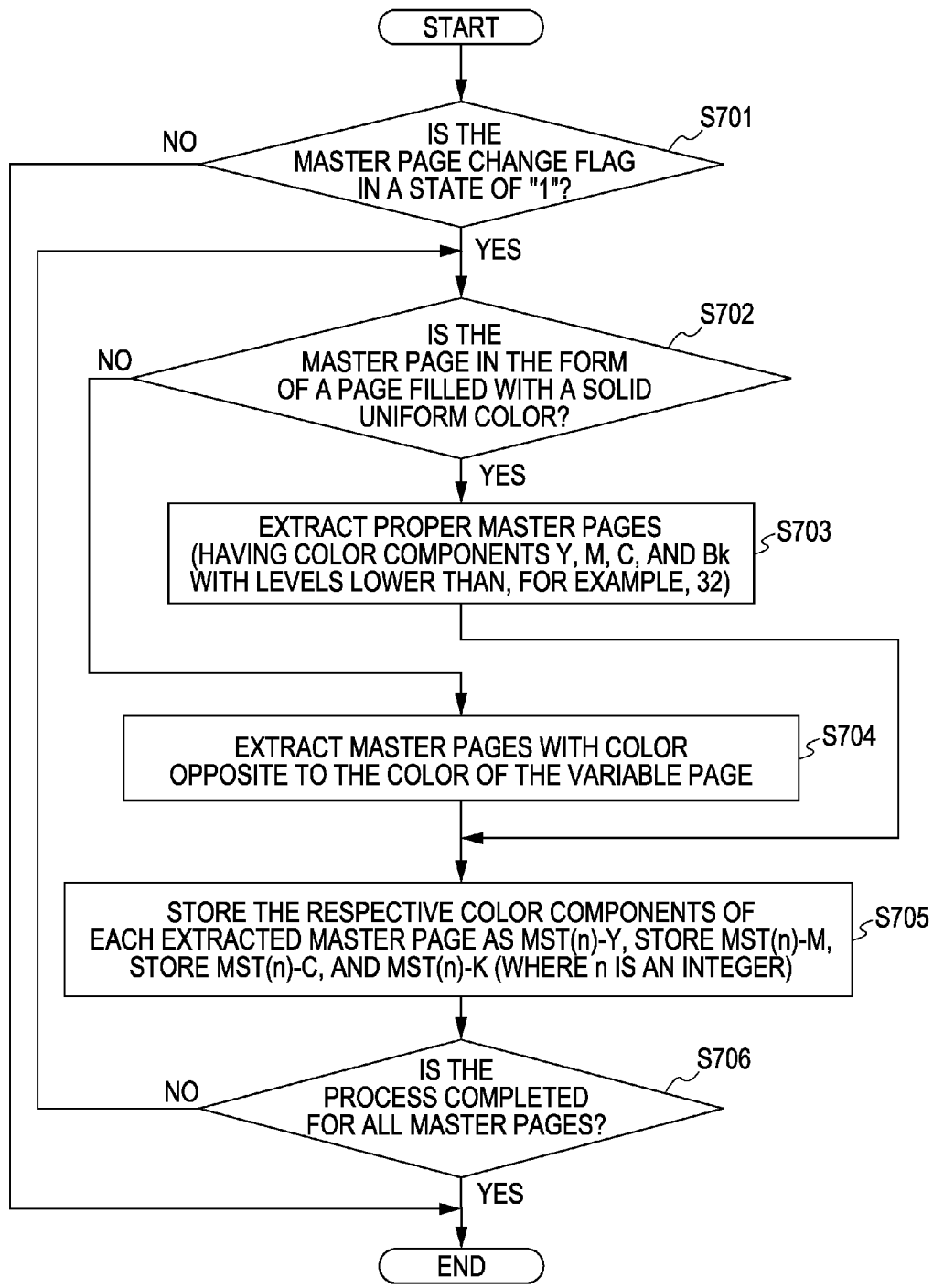
FIG. 7 is a flowchart showing a process of extracting a plurality of candidates for a master page for use with a variable page according to an embodiment of the present invention.

Referring to a flowchart shown in FIG. 7, the operations of steps S106 and S107 are described in further detail below.

In step S701, it is determined whether the master page change flag was set in step S607.

If the master page change flag is in the set state, then in step S702, it is determined whether the master page is a solid image with a uniform color.

In a case in which it is determined in step S702 that the master page is a solid image of a uniform color, then in step S703, a plurality of master pages having a color density equal to or less than 32 for all color components of Y, M, C, and Bk are extracted.

On the other hand, in a case in which it is determined in step S702 that the master page is not a solid image of a uniform color, then in step S704, master pages having a color that is opposite to the color of any variable page are extracted (for example, when variable pages have warm colors, master pages having cold colors are extracted.

In step S705, the color component values of the master pages extracted in step S703 or 5704 are stored as MST(n)-Y, MST(n)-M, MST(n)-C, and MST(n)-Bk (where n is an integer).

In step S706, it is determined whether the process described above is completed for all master pages.

Referring again to FIG. 1, in step S108, the plurality of master pages extracted above are proposed to the user as candidates for the correct master page.

Figure 8:
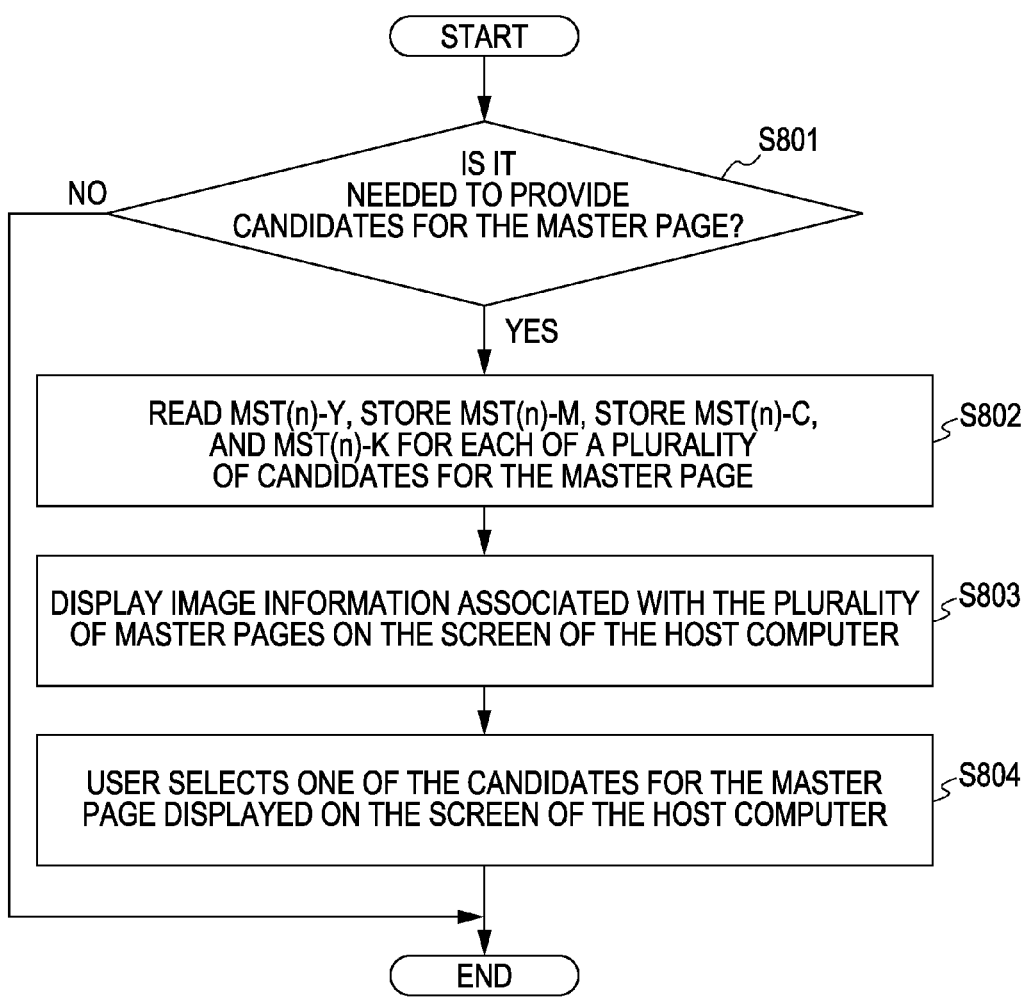
FIG. 8 is a flowchart showing a process of presenting to a user a plurality of candidates for a master page according to an embodiment of the present invention.

The process in step S108 is described in further detail below with reference to a flowchart shown in FIG. 8.

In step S801, it is determined whether candidates for the master pages are needed.

If the answer to step S801 is yes, then in step S802, the color component values MST(n)-Y, MST(n)-M, MST(n)-C, and MST(n)-Bk (where n is an integer) of the plurality of candidates for the master page are read. In step S803, based on the read color component values, the image information (indicating, for example, colors or patterns) of each of the plurality of candidates for the master page is displayed on the display 1408 of the host computer 1401.

In step S804, the user selects a proper master pager, to be used instead of the current master page, from the plurality of candidates for the master page displayed on the display 1408 of the host computer 1401.

Note that when it is determined in step S106 that colors are similar, the current master page may be replaced with another proper master page without performing steps S107 and 5108.

Figure 9:
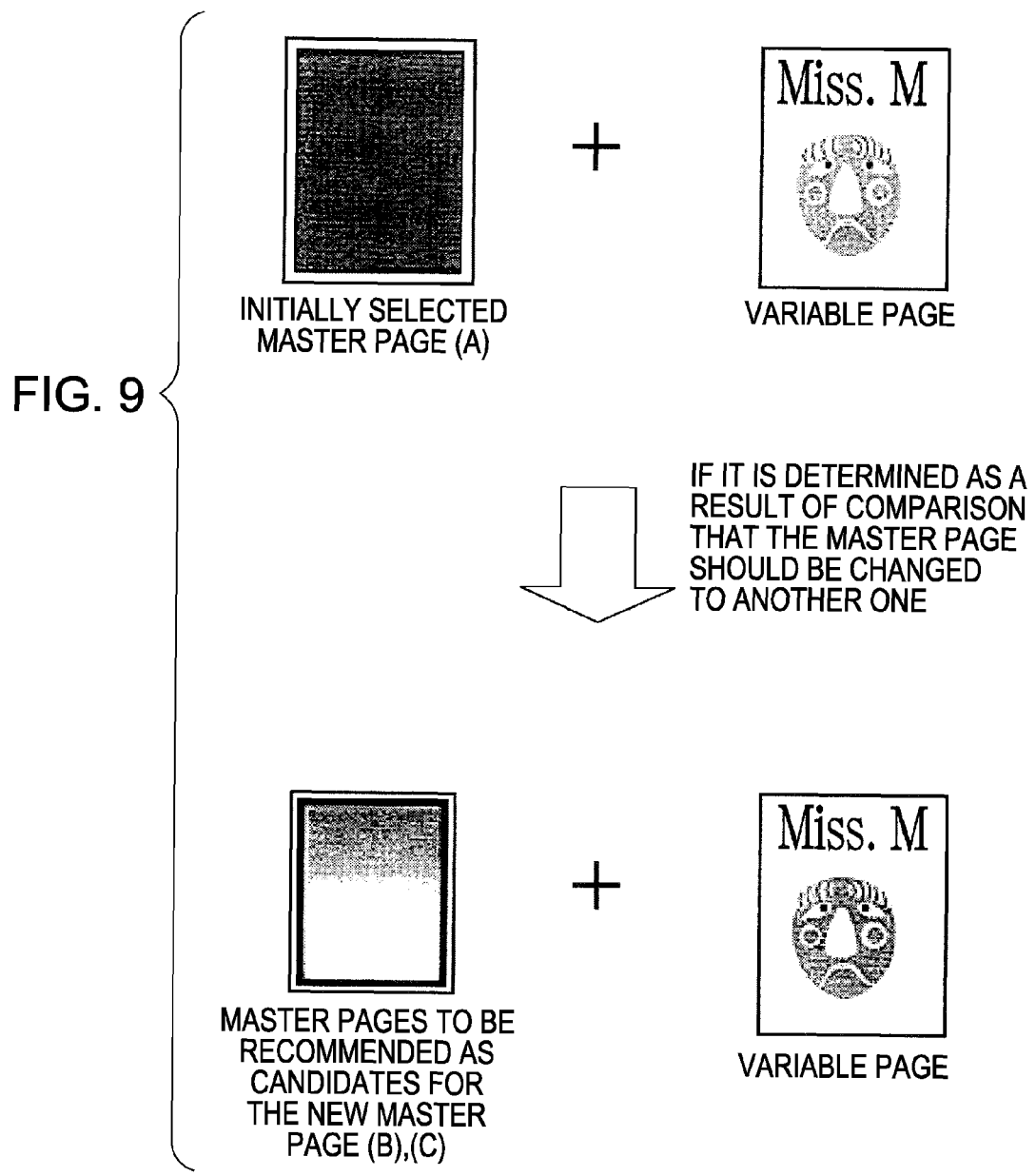
FIG. 9 is a diagram showing an example of a change of a master page according to an embodiment of the present invention.

Referring to FIG. 9, a specific example of a master page that should be changed to another master page and an example of a manner in which the master page is changed are described. The master page should be changed when the master page (A) is similar in color to a mark of a variable page and thus the mark of the variable page vanishes into the background, that is, the master page. In such a case, the master page is changed as follows. When the master page (A) is compared with the variable page, if master page (A) is similar in color to the mark of the variable page, then other master pages (B and C) having a color that is not similar to the color of the variable page are extracted. The extracted master pages (B and C) are displayed on the screen of the host computer 1401. If the user selects one of the displayed master pages, the current master page is changed to the new master page selected by the user.

As described above, when the user performs printing in the variable printing mode, if the master page and the variable page are similar in color, the warning is given to the user and candidates for the alternative master page are proposed to the user. If the user selects a proper master page from the candidates, the current master page is changed to the selected master page thereby solving the problem with the similarity in color near the boundary line between the master page and the variable page.

By changing the current master page to a new master page having a color that is not similar to any of the plurality of variable pages, it becomes unnecessary for the user to change the master page on a page-by-page basis for the plurality of variable pages.

Figure 10:
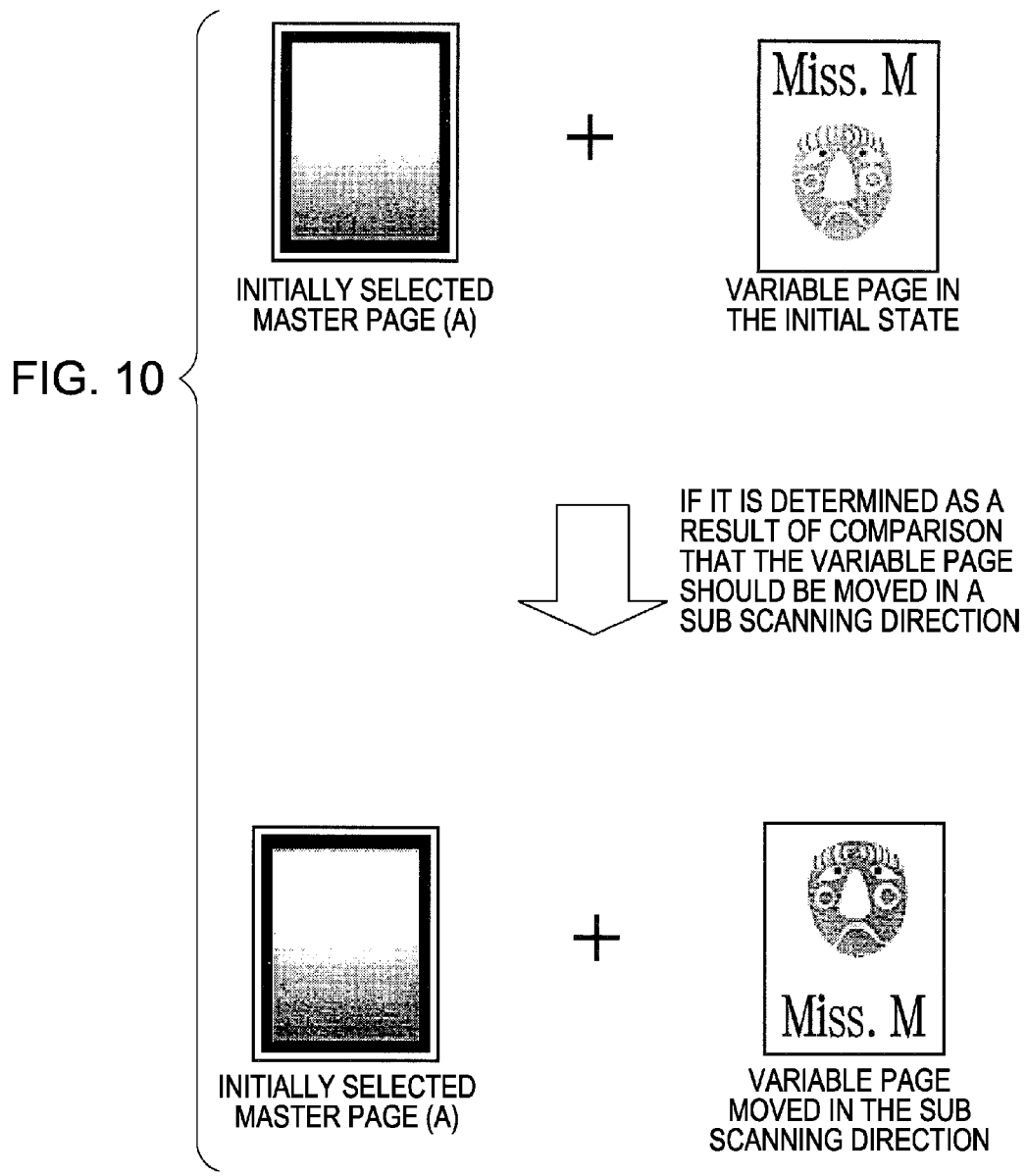
FIG. 10 is a diagram showing an example of a modification in which a variable page is moved in a sub-scanning direction according to an embodiment of the present invention.
Figure 11:
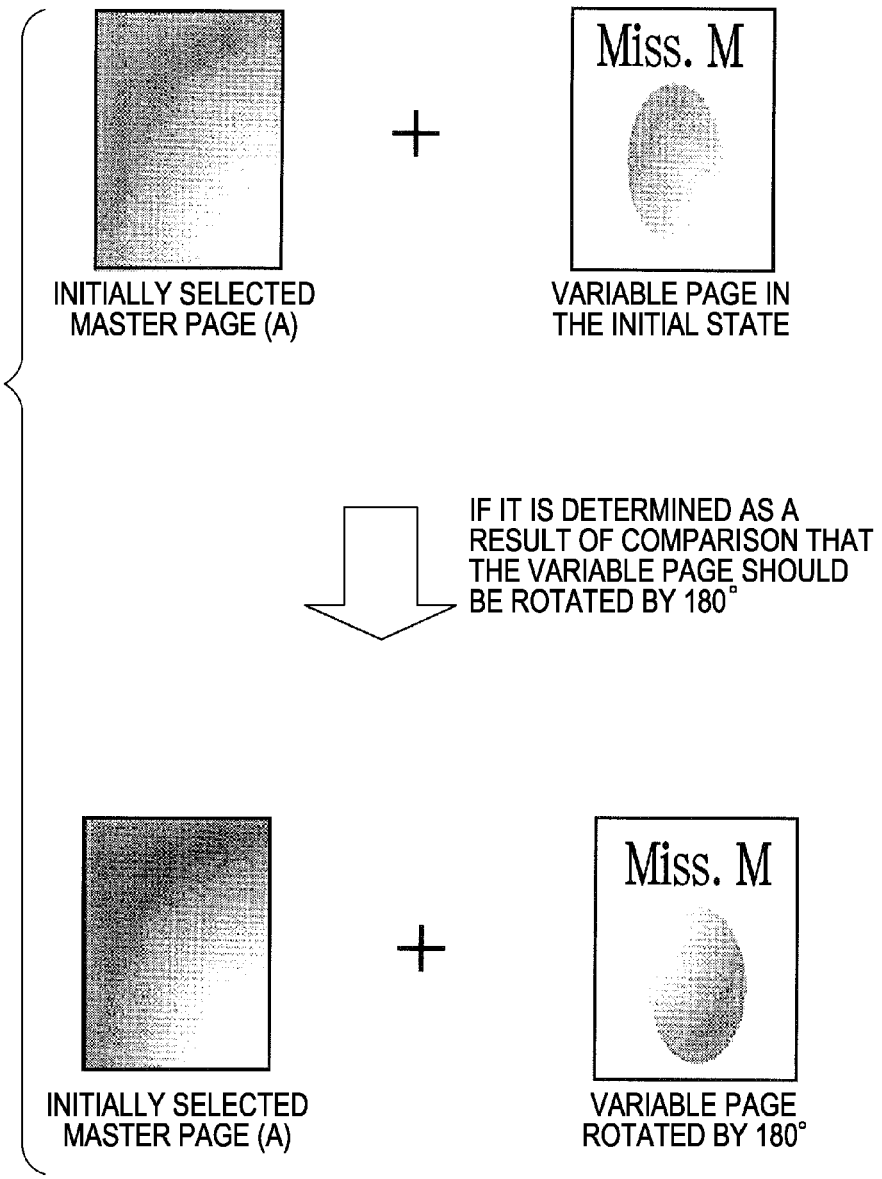
FIG. 11 is a diagram showing an example of a modification in which a variable page is rotated by 90° according to an embodiment of the present invention.
Figure 12:
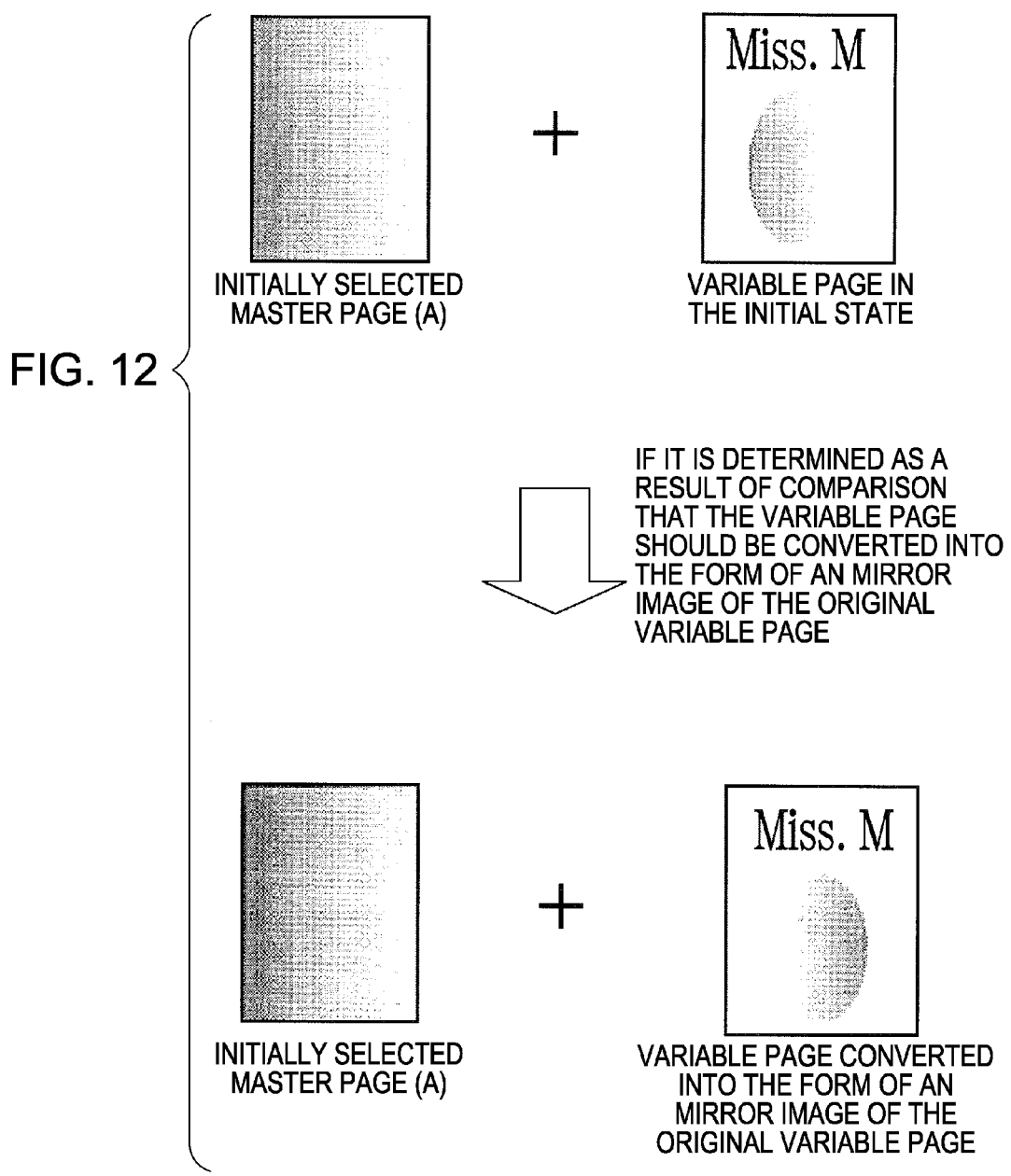
FIG. 12 is a diagram showing an example of a modification in which a variable page is replaced with a mirror image of the variable page according to an embodiment of the present invention.
Figure 13:
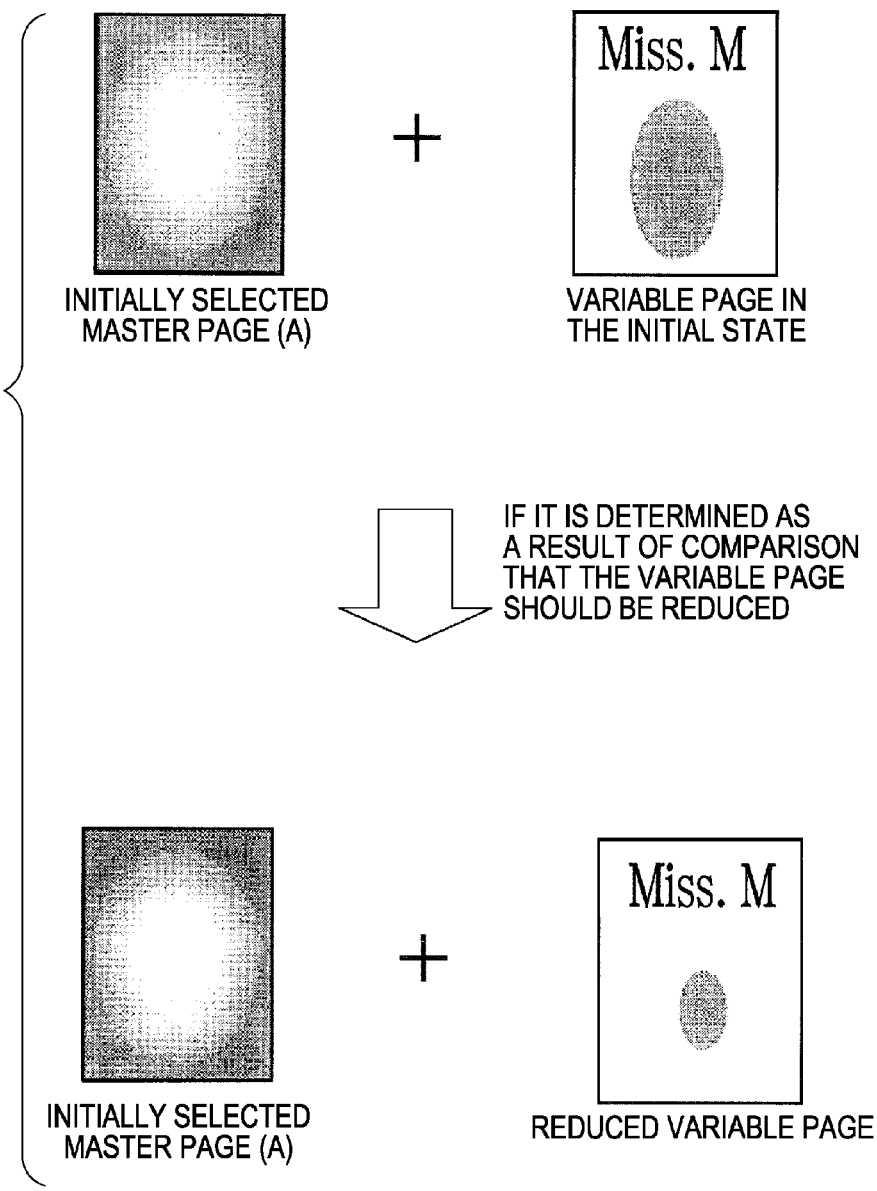
FIG. 13 is a diagram showing an example of a modification in which a variable page is reduced according to an embodiment of the present invention.

Although in the embodiment described above, the master page is changed, a variable page may be changed instead of the master page. That is, when the user performs printing in the variable printing mode, if a master page and a variable page are similar in color, a warning is given to the user. To solve the problem with the similarity in color near the boundary line between the master page and the variable page, the layout of the variable page is changed by performing one or a combination of the following processes on the variable page using known image processing techniques: movement in the main or sub scanning direction, rotation by an arbitrary angle, replacement to a mirror image, and enlargement/reduction. FIG. 10 shows an example in which a variable page is moved in a sub scanning direction to eliminate the similarity in color near the boundary line between a master page and a variable page. FIG. 11 shows an example in which a variable page is rotated by 180° to eliminate the similarity in color near the boundary line between a master page and a variable page. FIG. 12 shows an example in which a variable page is replaced to a mirror image thereof to eliminate the similarity in color near the boundary line between a master page and a variable page. FIG. 13 shows an example in which a variable page is reduced to eliminate the similarity in color near the boundary line between a master page and a variable page.

Second Exemplary Embodiment

Now, a second embodiment of the present invention is described below.

In FIG. 14, reference numeral 1401 denotes a host computer, and reference numeral 1415 denotes an image processing apparatus such as a digital multifunction peripheral device.

The host computer 1401 includes a CPU 1402 adapted to control the image processing apparatus in accordance with a program read from a ROM 1403 via a CPU bus 2a. The host computer 1401 also includes a RAM 1404 used as a work area of the CPU 1402 and internally having a work area 4a, a communication controller 1405 adapted to control two-way communication with another host computers, a printer, etc., an operation unit (an input device such as a keyboard) 1406, an external storage unit 1407 such as a hard disk, a display 1408 (for example, a CRT display), and an external communication port 1409 that connects the host computer 1401 with the image processing apparatus 1415.

The image processing apparatus 1415 includes a liquid crystal panel 1410 for controlling the operation of the main part of the image processing apparatus 1415, a network board 1411 for connecting the image processing apparatus 1415 to a network, an image processing unit 1412, a printing unit 1413, and an external storage unit 1414 such as a hard disk. The image processing unit 1412 is responsible for general control of image processing and has a program for predicting the undesirable possibility that a variable page is indistinguishable from a master page at a boundary thereof (the variable page visually vanishes in the master page or the master page visually vanishes in the variable page) in the variable printing mode and also has a warning process table indicating a list of warning processes to be performed when it is predicted that the boundary will be indistinguishable.

FIG. 15 shows an example of a warning process table indicating a list of warning processes to be performed when the boundary between a variable page and a master page is indistinguishable in the variable printing mode. In this example, the warning process table includes a "registration number" field, an "indistinguishability (color difference)" field, a "destination of warning" field, an "action to be done" field, and a "comment" field. The "indistinguishability (color difference)" refers to the degree of indistinguishability of the boundary between a variable page and a master page. 2006 Warning process tables having the same content are stored in the host computer 1401 and the image processing unit 1412 in the image processing apparatus 1415. In this warning process table, five warning levels are defined as the "indistinguishability condition (color difference)" that causes indistinguishability of the boundary between the variable page and the master page. That is, the destination to which to send the warning and the process to be performed are varied depending on the warning level, that is, the degree of indistinguishability between the master page and the variable page. Note that the content of the warning process table may be arbitrarily set by the user. The content of each field of the warning process table is explained below.

In the registration number field, a serial number of warning process condition data is described. Note that the registration number is also used to indicate the warning level. That is, in this second embodiment, the value indicating the distinguishability of the boundary between the master page and the variable page is equal to or less than a threshold value (predetermined by the user), a warning process is performed. More specifically, in the second embodiment, the distinguishability is represented by the color different ($\Delta E$), and, when the color difference ($\Delta E$) is less than the threshold value, a determination is made as to which one of the warning levels (defined for the respective registration numbers) the color difference corresponds to. It is also possible for the user to specify proper one of the registration numbers so that the distinguishability corresponding to the specified registration number is obtained in the printing.

The indistinguishability (the color difference) is expressed by a value indicating the degree of the indistinguishability of the boundary between the variable page and the master page in the variable printing, and a warning is issued depending on the value described in the indistinguishability field. In this specific embodiment, the color difference ($\Delta E$) is used as the value indicating the indistinguishability. In the second embodiment, when the color difference between the variable page and the master page is equal to or less than the predetermined threshold value, the indistinguishability (the color difference) in the warning process table is checked. More specifically, the color difference is compared, sequentially in the ascending order of the registration number, with the value defined in the indistinguishability (color difference) field. If the color difference is less than the indistinguishability value of a particular registration number, the warning process defined for that registration number is selected.

In the "destination of warning" field, the destination to which to send a warning is described. When a warning process of a particular registration number is selected, a warning is sent to a user defined in the "destination of warning" field in the row corresponding to this registration number. In a case in which a plurality of users are defined in the "destination of warning" field, the warning is sent to these users. The users in the "destination of warning" field of each registration number may be specified via the display panel such as the liquid crystal panel 1410 of the image processing apparatus 1415. Each user in the "destination of warning" is expressed, for example, by a combination of a character string "D", an arbitrary character string, and a destination interface, wherein the character string "D" indicates a sender of print data. In this specific example shown in FIG. 15, "UsrX" (where X is 1, 2, 4, or 5) indicates a name of a host computer used by a user. When an arbitrary character string is described in the "destination of warning" field of the warning process table, the warning is sent to an interface address corresponding to the arbitrary character string. For example, to specify a computer on a network as a destination of warning, a network address (for example, IP address) assigned to that computer is described as the arbitrary character string. To define a plurality of destinations of warning, respective destinations are delimited by a slash "/". For example, when "D/Usr1" is defined in the "destination of warning" field, the warning is sent to the sender of print data and the host computer registered as "Usr1". Although in the present example, up to four destinations are defined in the "destination of warning" field, a greater number of destinations may be defined.

In the "process to be performed" field, a process or a control to be performed in addition to the sending of the warning is described. In accordance with the content described in this field, the operation of the image processing apparatus is controlled. For example, the operation of the image processing apparatus is stopped or the operation is brought into a waiting state to wait for a command to be given. Although in the specific example shown in FIG. 15, four different types of operations are defined, one or a combination of arbitrary operations may be defined.

In the "comment" field, a special process, to be performed in addition to the operation defined in the "process to be performed" field, is described.

FIG. 16 is a flowchart showing an example of a process according to the second embodiment of the present invention.

In step S1601, the image processing apparatus 1415 receives variable print data.

In step S1602, the color difference between a variable page and a master page at the boundary thereof in the variable print mode is determined to check whether the variable page and the master page are well distinguishable. That is, in this step, the color difference is calculated, and it is determined based on the calculated color difference whether the boundary between the variable page and the master page is well distinguishable.

In step S1603, the value of the color difference calculated in step S1602 is compared with a predetermined threshold value. When the calculation performed in step S1602 indicates that the color difference near a boundary line between the variable page and the master page is equal to or greater than a predetermined threshold value, it is determined that the variable page and the mater page can be easily distinguished from each other at the boundary.

If it is determined in step S1603 that the variable page and the mater page can not be easily distinguished from each other at the boundary, then in step S1604, a warning process is performed to send a warning to the sender of the print data or to a destination specified in advance by the user. In the case in which the destination has been specified in advance, the printing process is stopped when the warning is sent or data is replaced or discarded in accordance with a command issued by the user in response to the warning.

After the warning process in step S1604, the process proceeds to step S1605. In step S1605, automatically or in accordance with a command issued by the user, a process is performed to make the master page and the variable page clearly distinguishable at the boundary.

Figure 17:
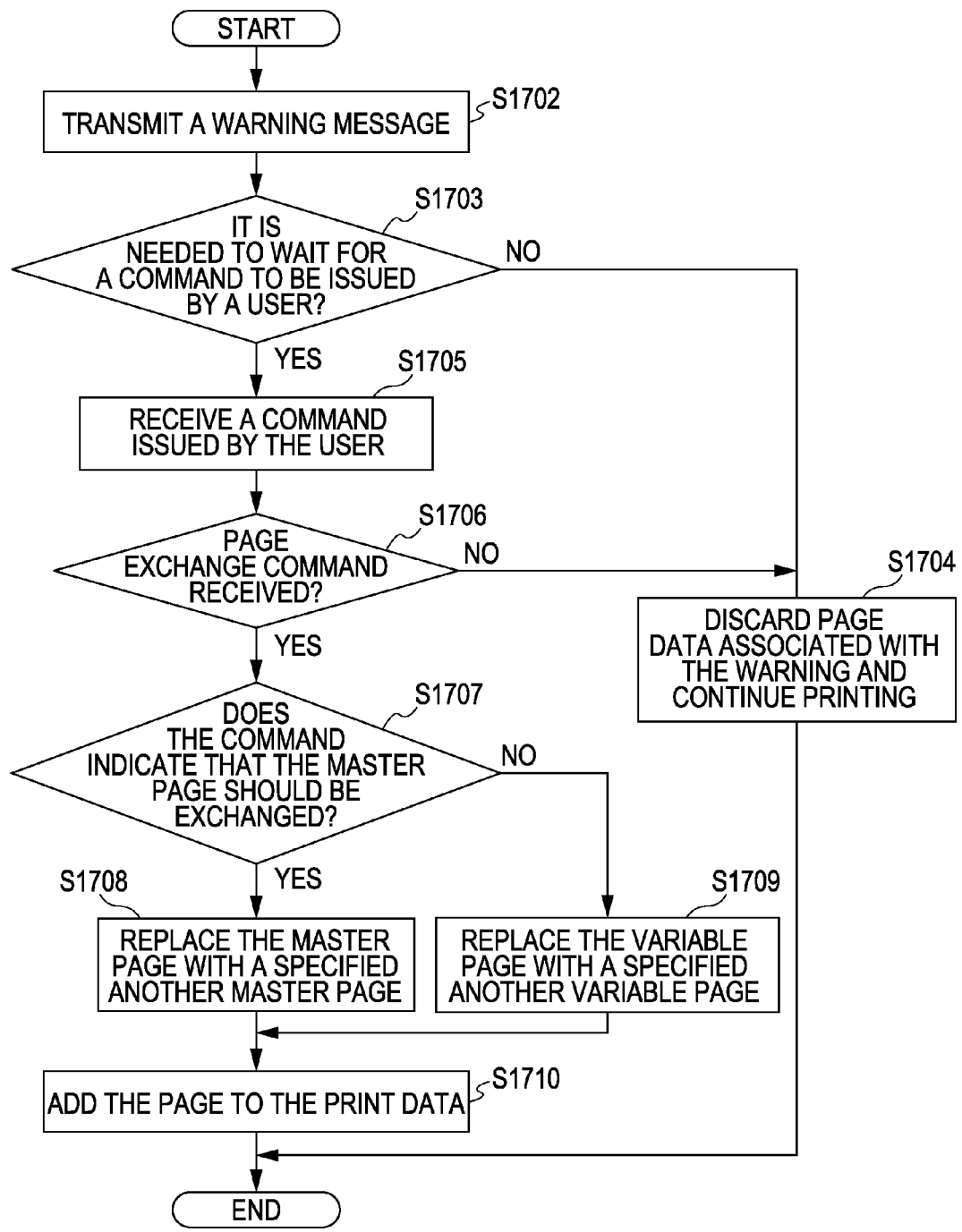
FIG. 17 is a flowchart showing an example of a warning process according to an embodiment of the present invention.

An example of a warning process performed in step S1604 in FIG. 16 is described with reference to a flowchart shown in FIG. 17. In this example, the warning process table described above is not used.

In the variable print mode, if the color difference near the boundary line between a master page and a variable page is equal to or less than a predetermined threshold value (specified in advance by a user), the following process is performed.

In step S1702, a warning is sent to the sender of the print data or to a destination specified in advance by the user.

In step S1703, it is determined whether it is specified to stop the operation of the image processing apparatus after the transmission of the warning and wait for a command to be issued by a user.

If it is determined in step S1703 that it is specified not to wait for a command to be issued by a user, the process proceeds to step S1704. In step S1704, the page data for which the warning was issued is discarded.

On the other hand, if it is determined in step S1703 that it is specified to wait for a command to be issued by a user, the process proceeds to step S1705 to wait for a command to be issued by a user.

In step S1706, it is determined whether the command received in step S1705 from by the user is a command to replace the current print data with another print data. If the command is not such a command, then the process proceeds to step S1704 and the page data for which the warning was issued is discarded.

On the other hand, if it is determined in step S1706 that the command issued by the user indicates that the print data should be replaced with another print data, the process proceeds to step S1707. In step S1707, it is determined whether the print data to be replaced is the master page or the variable page. In a case in which the master page is specified as the print data to be replaced, the process proceeds to step S1708. However, if the variable page is specified as the print data to be replaced, the process proceeds to step S1709.

In step S1708, the master page is replaced with data specified by the sender of the data.

In step S1709, the variable page is replaced with data specified by the sender of the data.

In step S1710, the replaced master page or variable page is added to the print data. In this process, the replaced master page or variable page is added at a position arbitrarily specified by the user.

Figure 18:
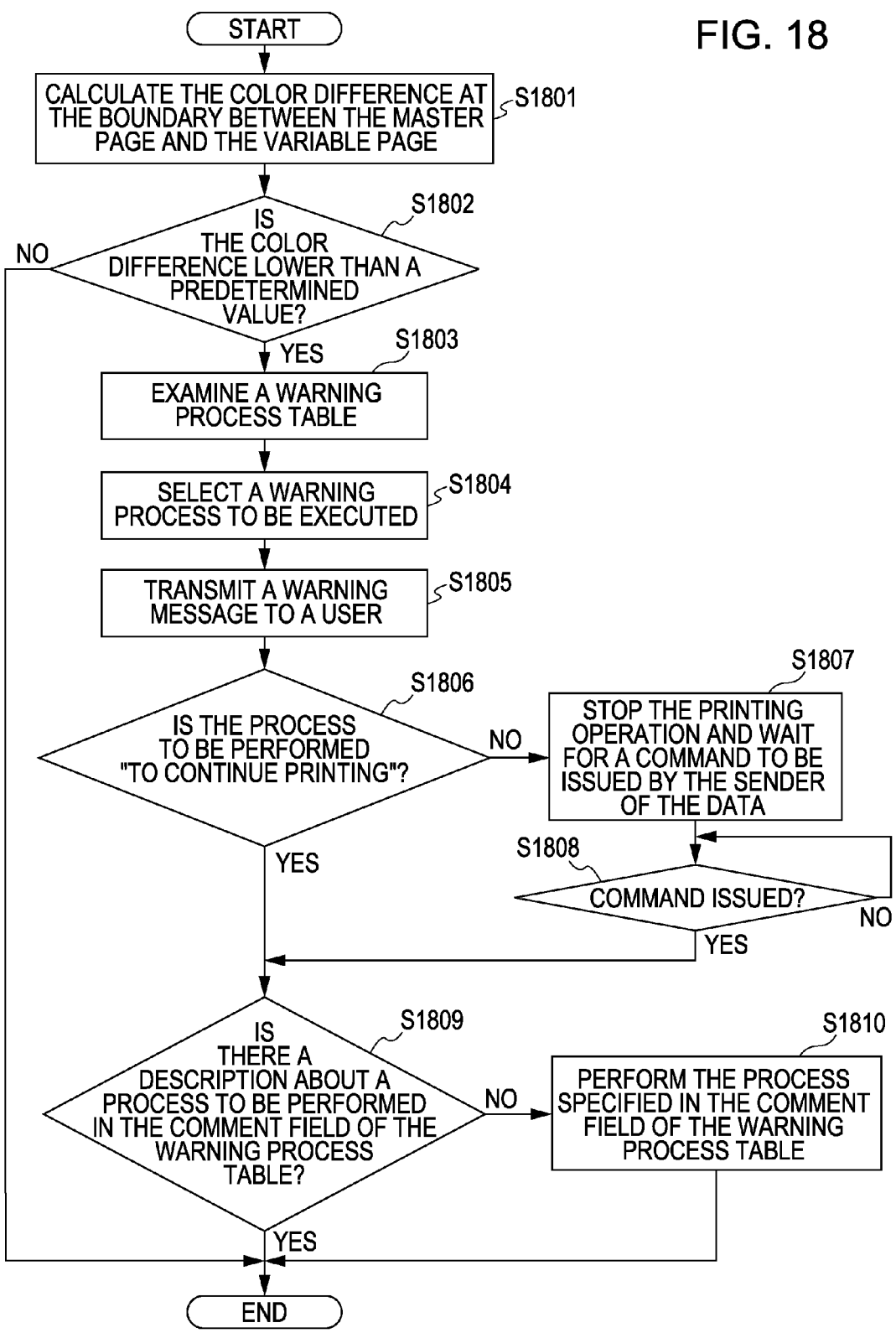
FIG. 18 is a flowchart showing an example of a warning process according to an embodiment of the present invention.

Another example of the process in step S1604 in FIG. 16 is described in detail with reference to a flowchart shown in FIG. 18. In this example, the warning process table described above is used.

In step S1801, the color difference between the master page and the variable page at the boundary thereof in the variable printing mode is calculated.

In step S1802, it is determined whether the color difference calculated in step S1801 is equal to or less than the threshold value (predetermined by the user). If the color difference calculated in step S1801 is equal to or less than the threshold value, the process proceeds to step S1803.

In step S1803, the warning process table shown in FIG. 15 is examined to determine the warning level or the registration number corresponding to the color difference calculated in step S1801.

In step S1804, a warning process to be performed for the variable page and the master page is selected based on the result of the examination in step S1803.

In step S1805, a warning is sent to a destination defined for the warning level determined in step S1803.

In step S1806, it is determined whether continuing or stopping of the printing operation is specified in the "process to be performed" field of the warning process table. If continuing of the printing operation is specified, the process proceeds to step S1809. On the other hand, if stopping of the printing operation is specified, the process proceeds to step S1807.

In step S1807, the printing operation of the image processing apparatus is stopped, and the process waits for a command such as a command to replace the data to be issued by the sender of the print data.

In step S1808, a determination is made at predetermined intervals as to whether a command such as a command to replace data has been received from the sender of the print data. If the command has been received, the process proceeds to step S1809.

In step S1809, it is determined whether a special process to be performed in addition to the process specified in the "process to be performed" field is described in the "comment" field. If such a special process is specified, the process proceeds to step S1810, however otherwise the process is ended.

In step S1810, the process specified in the "comment" field is performed. For example, in the case of the warning level (registration number) of 1, the image processing apparatus is controlled such that the image processing apparatus waits for a command to be issued by a user in a state in which the image processing apparatus can also accept a command issued via the display panel of the image process apparatus.

Figure 19:
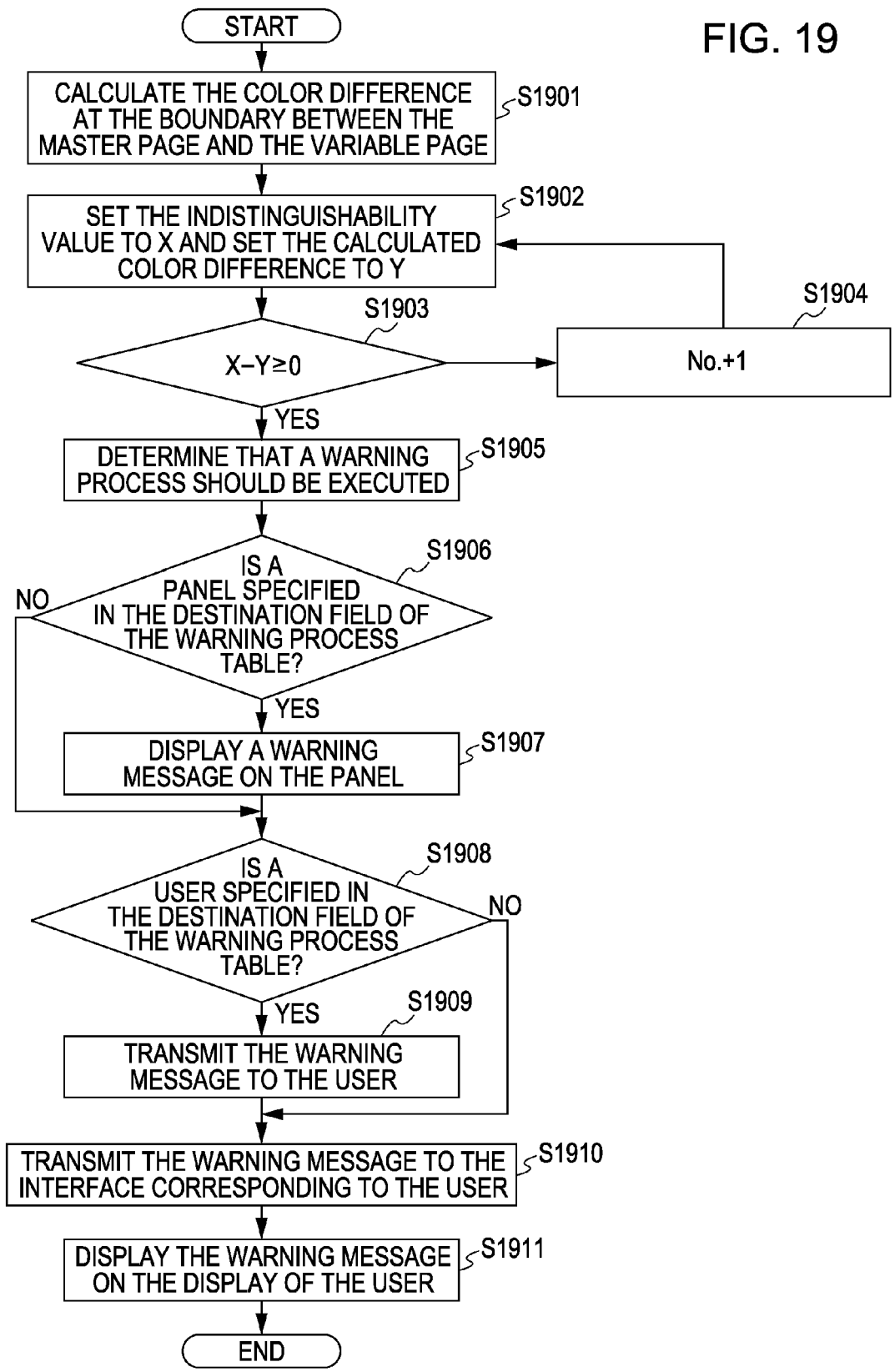
FIG. 19 is a flowchart showing an example of a warning process according to an embodiment of the present invention.

Another example of the process in step S1604 in FIG. 16 is described in detail with reference to a flowchart shown in FIG. 19. In this example, the warning process table described above is used. The color difference between a master page and a variable page of print data is compared with the values defined in the "indistinguishability (color difference)" field of the warning process table, and a determination as to whether to transmit a warning is made depending on the result of the comparison.

In step S1901, the color difference between the master page and the variable page at the boundary thereof is calculated.

In step S1902, the value defined in the "indistinguishability (color difference)" field in the row of the registration number of 1 in the warning process table is set to X, and the calculated color difference between the master page and the variable page is set to Y.

In step S1903, X-Y is calculated, and it is determined whether the result is equal to or greater than 0. If the result is equal to or greater than 0, the process proceeds to step S1905, however otherwise the process proceeds to step S1904. When X-Y is equal to or greater than 0, the color difference between the master page and the variable page of the print data is equal to or less than the value defined in the "indistinguishability (color difference)" field of the row of the registration number of 1. In this case, it is predicted that the boundary between the master page and the variable page will be indistinguishable, and thus it is needed to perform a warning process.

On the other hand, when X-Y is smaller than 0, the color difference between the master page and the variable page of the print data is greater than the value defined in the "indistinguishability (color difference)" field of the row of the registration number of 1, and thus it is predicted that the boundary between the master page and the variable page is distinguishable.

In step S1904, the value indicating the registration number to be examined is incremented by 1, and the process returns to step S1902. In step S1902, the calculated color difference between the master page and the variable page of the print data is compared with the value defined in the "indistinguishability (color difference)" in the row with the registration number equal to the value incremented by 1 in step S1904.

In step S1905, a warning level and a warning process to be performed are determined.

In step S1906, it is determined whether a panel is defined in the "destination of warning" field. If so, the process proceeds to step S1907, but otherwise the process proceeds to step 1908.

In step S1907, a warning message is displayed on the operation panel of the image processing apparatus.

In step S1908, it is determined whether "Usr" is described in the "destination of warning" field. If so, the process proceeds to step S1909, but otherwise the process proceeds to step S1910.

In step S1909, a warning message is sent to a host computer registered as "Usr".

In step S1910, a warning message is sent to an interface coupled with "Usr". In a case in which the interface has a network address or the like, the warning massage is sent to the host computer at that address.

In step S1911, the host computer displays the received warning message on the display thereof.

Although in the warning process table according to this second embodiment, the warning processes are listed in the order of the color difference, warning processes may be defined in accordance with senders of print data. In this case, when a plurality of users perform printing in the variable printing mode, the criterion associated with indistinguishability and warning processes may be defined individually for each sender of print data. In this case, the determination is not made in step S1802 shown in FIG. 18 but the determination is made differently depending on users in accordance with the warning process table.

Although in this second embodiment, the warning process is selected from the warning process table based on the color difference between the variable page and the master page, a particular registration number in the warning process table may be specified when print data is sent from a sender. That is, users are allowed to specify an arbitrary indistinguishability level in the variable printing mode for each printing operation. That is, users are allowed to freely specify a criterion based on which a determination is made as to whether a warning process should be performed.

Although in the first embodiment and also in the second embodiment, the indistinguishability is defined by the color difference between the master page and the variable page, the indistinguishability may be defined in other ways. For example, a numeric value is attached as a tag to each of master pages and variable pages, and the distinguishability is determined by comparing the numeric values attached to a master page and a variable page. More specifically, a tag is determined for each of master pages and variable pages depending on the hue of a color which is dominant in each page. When a tag value is equal or similar between a master page and a variable page, it is determined that the boundary between the master page and the variable page is indistinguishable, and a warning is given to a user.

In the first and second embodiments described above, the printing is assumed to be performed in the variable printing mode, the present invention may also be applied to printing in which a first page and a second page is combined in a normal printing mode.

In the first and second embodiments described above, when variable printing is performed, a problem associated with similarity between a variable page and a master page at the boundary between them can be avoided, and thus it is possible to prevent a variable page from becoming indistinguishable from a master page or a master page from becoming indistinguishable from a variable page. This allows a reduction in cost due to a failure in variable printing.

In the first embodiment, when variable printing is performed, similarity between a master page and a variable page at the boundary between them can be avoided by modifying a layout via one or a combination of the following processes: movement of the variable page in the main or sub scanning direction, rotation of the variable page by an arbitrary angle, replacement of the variable page with a mirror image thereof, and reduction/enlargement of the variable page. Thus it is possible to prevent a variable page from becoming indistinguishable from a master page or a master page from becoming indistinguishable from a variable page. This allows a reduction in cost due to a failure in variable printing.

In the first and second embodiments, when variable printing is performed, if it is predicted that a variable page will be visually indistinguishable from a master page or the master page will be visually indistinguishable from the variable page, a user is prompted to modify a combination of the master page and the variable page. This allows a reduction in cost due to a failure in variable printing.

Note that the present invention can also be implemented by providing, to a system or an apparatus, a storage medium having software program code stored thereon and reading and executing the program code on a computer (or a CPU or a MPU) disposed in the system or the apparatus thereby implementing the functions disclosed in the embodiments described above. In this case, the program code read from the storage medium implements the novel functions disclosed in the embodiments described above, and the storage medium on which the program code is stored falls within the scope of the present invention. As for the storage medium for providing the program code, for example, a floppy disk, a hard disk, an optical disk, a magneto-optical disk, a CD-ROM, a CD-R, a magnetic tape, a nonvolatile memory card, or a ROM may be used.

Any function disclosed in the embodiments may be implemented not only by executing the program code on a computer, but part or all of the processes may be performed by an operating system or the like running on the computer in accordance with a command issued by the program code.

The program code stored on the storage medium may be loaded into a memory of an extension card inserted in a computer or into a memory of an extension unit connected to a computer, and part or all of the process may be performed by a CPU disposed on the extension card or the extension unit in accordance with the loaded program code. Such implementation of the functions also falls within the scope of the present invention.

Note that any function disclosed in the above-described embodiments of the present invention may also be realized on a computer by providing a program code that realizes the function to the computer via a communication network such as the Internet or an intranet.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

What is claimed is:

1. An image processing apparatus adapted to perform variable printing in a form of a composite of a master page and a variable page, the image processing apparatus comprising:
   a comparison unit configured to compare a color of the master page and a color of an object of the variable page;
   a display unit configured to, in a case where the color of the master page and the color of the object of the variable page are similar, display a plurality of candidates for the master page having a color that is not similar to the color of the object of the variable page; and
   a combining unit configured to combine a master page selected by a user from the plurality of candidates for the master page displayed by the display unit and the variable page.

2. image processing apparatus according to claim 1, wherein the comparison unit compares each of color components Y, M, C, and Bk of the colors of the master page and the object of the variable page.

3. The image processing apparatus according to claim 1, wherein the comparison unit compares the colors between the master page and each of a plurality of variable pages.

4. The image processing apparatus according to claim 1, further comprising: a warning unit configured to send a warning to a user in a case where the color of the master page and the color of the object of the variable page are similar.

5. A method of performing variable printing in a form of a composite of a master page and a variable page, the method comprising:
   comparing a color of the master page and a color of an object of the variable page;
   displaying, in a case where the color of the master page and the color of the object of the variable page are similar, a plurality of candidates for the master page having a color that is not similar to the color of the object of the variable page; and
   combining a master page selected by a user from the plurality of displayed candidates for the master page and the variable page.

6. The method according to claim 5, wherein the comparing comprises comparing each of color components Y, M, C, and Bk of the colors of the master page and the object of the variable page.

7. The method according to claim 5, further comprising: sending a notification to a user in a case where the color of the master page and the color of the object of the variable page are similar.

8. The method according to claim 5, wherein the changing comprises changing the master page in accordance with a command issued by a user.

9. The method according to claim 7, wherein the sending of the notification comprises selecting, depending on a degree of similarity, a destination to which to send the notification or an operation to be performed in conjunction with the notification.

10. The method according to claim 9, wherein an operation performed in conjunction with the sending of the notification is stopping of printing, continuing of printing, or discarding of print data.

11. A non-transitory machine-readable medium having stored thereon instructions which, when executed by an apparatus, causes the apparatus to perform a method, the method comprising:
   performing a comparison a color of the master page and a color of an object of the variable page;
   displaying, in a case where the color of the master page and the color of the object of the variable page are similar, a plurality of candidates for the master page having a color that is not similar to the color of the object of the variable page; and
   combining a master page selected by a user from a plurality of displayed candidates for the master page and the variable page.

12. A non-transitory computer-readable storage medium storing a program that causes an image processing apparatus to perform a method of performing variable printing in a form of a composite of a master page and a variable page, the method comprising:
   performing a comparison a color of the master page and a color of an object of the variable page;
   displaying, in a case where the color of the master page and the color of the object of the variable page are similar, a plurality of candidates for the master page having a color that is not similar to the color of the object of the variable page; and
   combining a master page selected by a user from the plurality of displayed candidates for the master page and the variable page.

* * * * *